(12) United States Patent
Togashi et al.

(10) Patent No.: US 7,145,429 B1
(45) Date of Patent: Dec. 5, 2006

(54) MULTILAYER CAPACITOR

(75) Inventors: Masaaki Togashi, Nikaho (JP); Chris T. Burket, Huntington Beach, CA (US)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/339,775

(22) Filed: Jan. 26, 2006

(51) Int. Cl.
*H01F 5/00* (2006.01)

(52) U.S. Cl. .................. 336/200; 361/321.2; 361/306.3

(58) Field of Classification Search .................. 336/83, 336/200, 232; 361/306.1–3, 321.1–6
See application file for complete search history.

(56) References Cited

U.S. PATENT DOCUMENTS

| | | | | |
|---|---|---|---|---|
| 6,934,145 B1 * | 8/2005 | Hsieh et al. | ............. | 361/321.2 |
| 7,046,500 B1 * | 5/2006 | Lee et al. | ................... | 361/303 |
| 7,050,288 B1 * | 5/2006 | Ahiko et al. | ................ | 361/303 |

FOREIGN PATENT DOCUMENTS

JP    A 2004-047983    2/2004

* cited by examiner

*Primary Examiner*—Tuyen T Nguyen
(74) *Attorney, Agent, or Firm*—Oliff & Berridge, PLC

(57) ABSTRACT

A multilayer capacitor comprises a multilayer body in which a plurality of dielectric layers are laminated, and first to fourth outer conductors formed on the multilayer body. The multilayer body includes first to fourth inner conductors. The first and second inner conductors have respective regions opposing each other with at least one dielectric layer in between. The first and second inner conductors are connected to the third and second outer conductors respectively. The third inner conductor is connected to the first and third outer conductors, and the fourth inner conductor is connected to the second and fourth outer conductors. Two outer conductors and the remaining two outer conductors are respectively formed on first and second side faces of the multilayer body which oppose each other and are parallel to an opposing direction of the first and second inner conductors.

10 Claims, 22 Drawing Sheets

MULTILAYER CAPACITOR

BACKGROUND OF THE INVENTION

1. Field of the Invention

The present invention relates to a multilayer capacitor.

2. Related Background Art

Known as this kind of multilayer capacitor is one comprising a multilayer body which is formed with a plurality of laminated dielectric layers and includes a plurality of inner conductors, and a plurality of outer conductors formed on the multilayer body.

Power supplies for central processing units (CPUs) mounted in digital electronic devices have been increasing their load current while lowering their voltage. Therefore, it has become very difficult to suppress the fluctuation in power supply voltage under a tolerable level in response to a drastic change in load current, whereby a multilayer capacitor known as decoupling capacitor has come into connection with a power supply. At the time when the load current fluctuates transiently, the multilayer capacitor supplies a current to the CPU, thereby suppressing the fluctuation of the power supply voltage.

In recent years, as the CPUs have further been raising their operating frequencies, the load current has been becoming faster and greater, whereby the multilayer capacitor used in the decoupling capacitor is demanded to increase its capacity and equivalent series resistance (ESR) to ensure a constant load line impedance over all frequencies, yet not to adversely affect the capacitor's ESL. Therefore, a multilayer capacitor whose outer conductor has a multilayer structure including an inner resistance layer, so as to increase the equivalent series resistance has been under consideration.

SUMMARY OF THE INVENTION

It is an object of the present invention to provide a multilayer capacitor which is easy to mount while increasing its equivalent series resistance.

The inventors conducted diligent studies about a multilayer capacitor which can increase its equivalent series resistance in a highly controlled manner. As a result, the inventors have found a new fact that, even when a multilayer body has the same number of inner conductors, the equivalent series resistance can be made greater when all the inner conductors are connected to outer conductors which are not connected to land patterns of a substrate or the like.

However, when mounting such a multilayer capacitor to a substrate or the like, the mounting direction is critical. Namely, since such a multilayer capacitor increases its equivalent series resistance by connecting inner conductors to outer conductors which are not connected to land patterns of the substrate or the like, it becomes difficult for the multilayer capacitor to exhibit a desirable magnitude of equivalent series resistance when mounted such that the outer conductors connected to the inner conductors are connected to land patterns. As a consequence, such a multilayer capacitor may become problematic in that it cannot increase the equivalent series resistance when the mounting direction is changed.

Therefore, the inventors conducted diligent studies about a multilayer capacitor capable of satisfying both of demands for increasing the equivalent series resistance and for suppressing the dependence of equivalent series resistance on the mounting direction. As a result, the inventors have found a new fact that it becomes possible to increase the equivalent series resistance while suppressing the dependence of equivalent series resistance on the mounting direction when only inner conductors having one of polarities among those having different polarities are connected to an outer conductor connected to a land pattern in a substrate or the like while the inner conductors having the other polarity are connected to an outer conductor not connected to a land pattern.

In view of such results of studies, in one aspect, the present invention provides a multilayer capacitor comprising a multilayer body in which a plurality of dielectric layers are laminated, and first to fourth outer conductors formed on the multilayer body; wherein the multilayer body includes first to fourth inner conductors; wherein the first and second inner conductors have respective regions opposing each other with at least one dielectric layer in between; wherein two outer conductors in the first to fourth outer conductors are formed on a first side face of the multilayer body parallel to a direction along which the first and second inner conductors oppose each other, whereas the remaining two outer conductors are formed on a second side face opposing the first side face; wherein the two outer conductors formed on the first side face and the remaining two outer conductors formed on the second side face are located at respective positions opposing each other in a direction along which the first and second side faces oppose each other; wherein the first inner conductor is connected to the third outer conductor; wherein the second inner conductor is connected to the second outer conductor; wherein the third inner conductor is connected to the first and third outer conductors; and wherein the fourth inner conductor is connected to the second and fourth outer conductors.

In this multilayer capacitor, either when the first and second outer conductors or the third and fourth outer conductors constitute a set of outer conductors connected to a land pattern, it is two species of inner conductors which are connected to one of the outer conductors connected to the land pattern, whereas it is only one species of inner conductors which are connected to the other. Therefore, the equivalent series resistance can be made greater in either case. Even when the above-mentioned multilayer capacitor is mounted to a substrate or the like in a different mounting direction, the first and second outer conductors or the third and fourth outer conductors can be connected to a land pattern as one set, whereby the equivalent series resistance can be increased independently of the mounting direction. Thus, the above-mentioned multilayer capacitor can increase the equivalent series resistance independently of the mounting direction, whereby its mounting becomes easier.

Preferably, the third and fourth inner conductors have respective regions opposing each other with at least one dielectric layer in between; the first and fourth outer conductors are formed on the first side face; the second and third outer conductors are formed on the second side face; and the second, first, fourth, and third outer conductors are located at respective positions opposing the first, second, third, and fourth outer conductors in the opposing direction of the first and second side faces in the multilayer body.

Alternatively, it will be preferred if the third and fourth inner conductors have respective regions opposing each other with at least one dielectric layer in between; the first and third outer conductors are formed on the first side face; the second and fourth outer conductors are formed on the second side face; and the second, first, fourth, and third outer conductors are located at respective positions opposing the first, second, third, and fourth outer conductors in the opposing direction of the first and second side faces in the multilayer body.

Alternatively, it will be preferred if the third and fourth inner conductors are arranged at the same position in the opposing direction of the first and second inner conductors while having respective regions adjacent to each other in the opposing direction of the first and second side faces; the first and third outer conductors are formed on the first side face; the second and fourth outer conductors are formed on the second side face; and the second, first, fourth, and third outer conductors are located at respective positions opposing the first, second, third, and fourth outer conductors in the opposing direction of the first and second side faces in the multilayer body.

In these cases, a magnetic field caused by a current flowing through the third inner conductor and a magnetic field caused by a current flowing through the fourth inner conductor cancel each other out. Therefore, the multilayer capacitor lowers its equivalent series inductance in these cases.

Preferably, the third and fourth inner conductors are arranged at respective positions different from each other in the opposing direction of the first and second inner conductors; the first and third outer conductors are formed on the first side face; the second and fourth outer conductors are formed on the second side face; and the fourth, third, second, and first outer conductors are located at respective positions opposing the first, second, third, and fourth outer conductors in the opposing direction of the first and second side faces in the multilayer body.

Alternatively, it will be preferred if the third and fourth inner conductors are arranged at the same position in the opposing direction of the first and second inner conductors; the first and third outer conductors are formed on the first side face; the second and fourth outer conductors are formed on the second side face; and the fourth, third, second, and first outer conductors are located at respective positions opposing the first, second, third, and fourth outer conductors in the opposing direction of the first and second side faces in the multilayer body.

In these cases, a magnetic field caused by a current flowing through the first inner conductor and a magnetic field caused by a current flowing through the second inner conductor cancel each other out. Therefore, the multilayer capacitor lowers its equivalent series inductance in these cases. The effect of lowering the equivalent series inductance becomes more remarkable when a number of first and second inner conductors are laminated.

In another aspect, the present invention provides a multilayer capacitor comprising a multilayer body in which a plurality of dielectric layers are laminated, and first to fourth outer conductors formed on the multilayer body; wherein the multilayer body includes first to fourth inner conductors; wherein the first and second inner conductors have respective regions opposing each other with at least one dielectric layer in between; wherein the first outer conductor is formed on a side face of the multilayer body parallel to a direction along which the first and second inner conductors oppose each other; wherein the second outer conductor is formed, on a side face of the multilayer body opposing the side face formed with the first outer conductor, at a position opposing the first outer conductor in a direction along which the side face formed with the second outer conductor and the side face formed with the first outer conductor oppose each other; wherein the third outer conductor is formed on a side face of the multilayer body parallel to the opposing direction of the first and second inner conductors; wherein the fourth outer conductor is formed, on a side face of the multilayer body opposing the side face formed with the third outer conductor, at a position opposing the third outer conductor in a direction along which the side face formed with the fourth outer conductor and the side face formed with the third outer conductor oppose each other; wherein the first inner conductor is connected to the third outer conductor; wherein the second inner conductor is connected to the second outer conductor; wherein the third inner conductor is connected to the first and third outer conductors; and wherein the fourth inner conductor is connected to the second and fourth outer conductors.

In this multilayer capacitor, either when the first and second outer conductors or the third and fourth outer conductors constitute a set of outer conductors connected to a land pattern, it is two species of inner conductors which are connected to one of the outer conductors connected to the land pattern, whereas it is only one species of inner conductors which are connected to the other. Therefore, the equivalent series resistance can be made greater in either case. Even when the above-mentioned multilayer capacitor is mounted to a substrate or the like in a different mounting direction, the first and second outer conductors or the third and fourth outer conductors can be connected to a land pattern as one set, whereby the equivalent series resistance can be increased independently of the mounting direction. Thus, the above-mentioned multilayer capacitor can increase the equivalent series resistance independently of the mounting direction, whereby its mounting becomes easier.

Preferably, the third and fourth inner conductors have respective regions opposing each other with at least one dielectric layer in between; the side face formed with the first outer conductor and the side face formed with the fourth side face are the same; and the side face formed with the second outer conductor and the side face formed with the third outer conductor are the same.

Alternatively, it will be preferred if the third and fourth inner conductors have respective regions opposing each other with at least one dielectric layer in between; the side face formed with the first outer conductor and the side face formed with the third outer conductor are the same; and the side face formed with the second outer conductor and the side face formed with the fourth outer conductor are the same.

Alternatively, it will be preferred if the side face formed with the first outer conductor and the side face formed with the third outer conductor are the same; the side face formed with the second outer conductor and the side face formed with the fourth outer conductor are the same; and the third and fourth inner conductors are arranged at the same position in the opposing direction of the first and second inner conductors, while having respective regions adjacent to each other in the opposing direction of the side face formed with the first and third outer conductors and the side face formed with the second and fourth outer conductors.

In these cases, a magnetic field caused by a current flowing through the third inner conductor and a magnetic field caused by a current flowing through the fourth inner conductor cancel each other out. Therefore, the multilayer capacitor lowers its equivalent series inductance in these cases.

The present invention can provide a multilayer capacitor which is easy to mount while increasing its equivalent series resistance.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments of the present invention will be explained in detail with reference to the accompanying drawings. In the explanation, constituents identical to each other or those having functions identical to each other will be referred to with numerals identical to each other without repeating their overlapping descriptions. Words "left" and "right" used in the explanation conform to the lateral direction in each drawing.

First Embodiment

Figure 1:
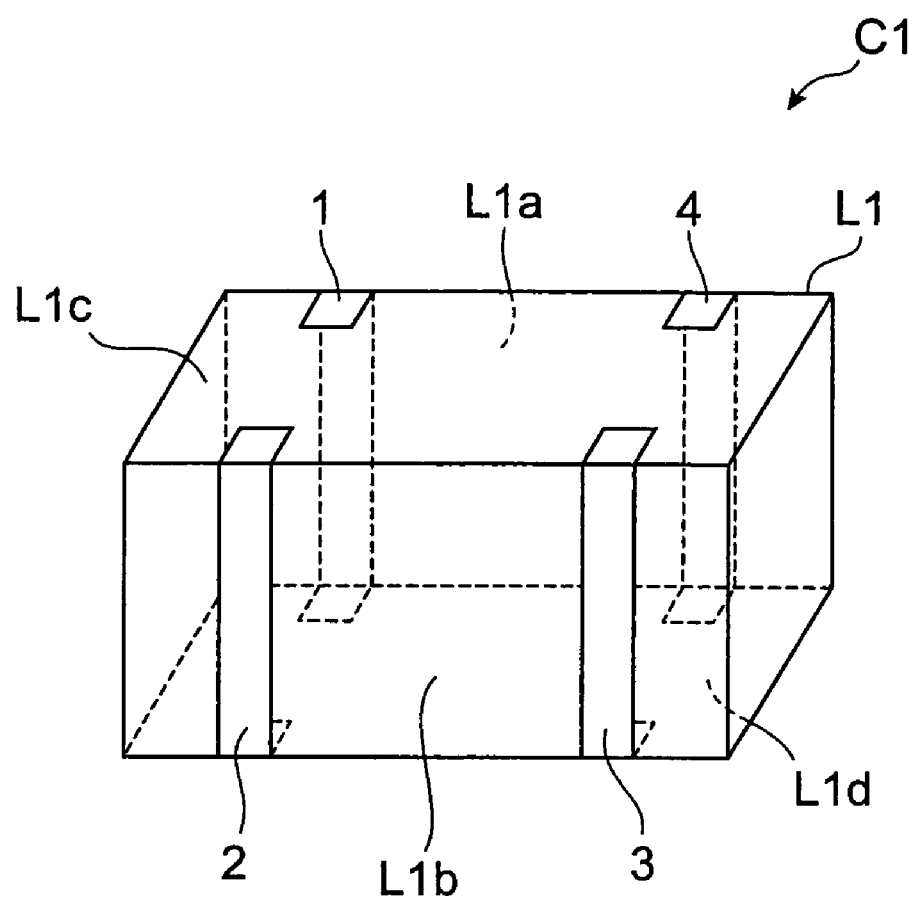
FIG. 1 is a perspective view of the multilayer capacitor in accordance with a first embodiment.
Figure 2:
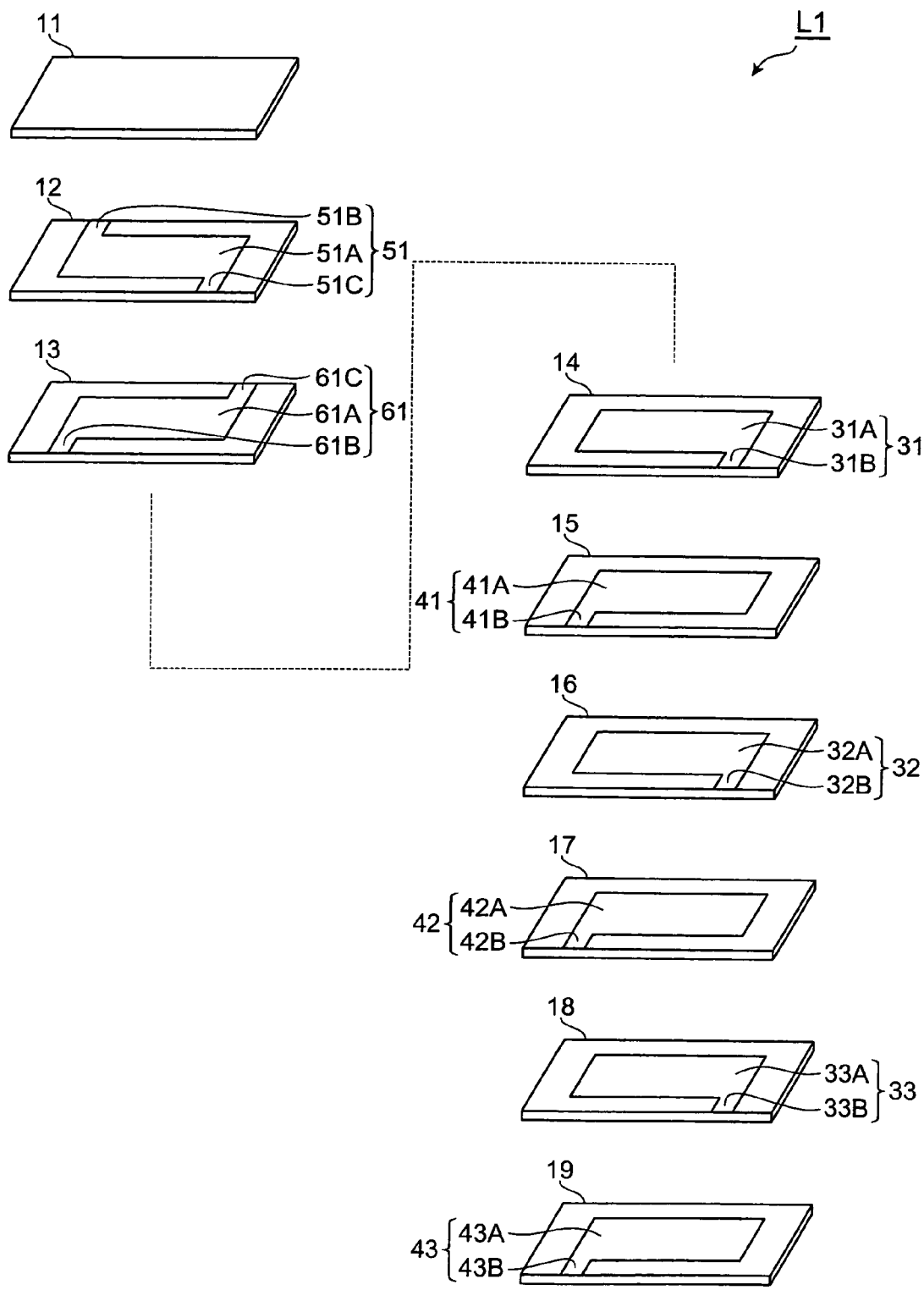
FIG. 2 is an exploded perspective view of the multilayer body included in the multilayer capacitor in accordance with the first embodiment.

With reference to FIGS. 1 and 2, the structure of the multilayer capacitor C1 in accordance with a first embodiment will be explained. FIG. 1 is a perspective view of the multilayer capacitor in accordance with the first embodiment. FIG. 2 is an exploded perspective view of the multilayer body included in the multilayer capacitor in accordance with the first embodiment.

As shown in FIG. 1, the multilayer capacitor C1 in accordance with the first embodiment comprises a multilayer body L1 having a substantially rectangular parallelepiped form, and four outer conductors formed on side faces of the multilayer body L1. The four outer conductors are a first outer conductor 1, a second outer conductor 2, a third outer conductor 3, and a fourth outer conductor 4. The four outer conductors are formed so as to be electrically insulated from each other on the surface of the multilayer body L1.

Both of the first outer conductor 1 and fourth outer conductor 4 are positioned on a first side face L1a in side faces parallel to an inner opposing direction of the multilayer body L1 which will be explained later, i.e., the first side face L1a that is a side face extending along the longitudinal direction of side faces L1c, L1d orthogonal to the inner opposing direction of the multilayer body L1. The first outer conductor 1 and fourth outer conductor 4 are formed such that the first outer conductor 1 and fourth outer conductor 4 are arranged successively from the left side to right side of FIG. 1.

Both of the second outer conductor 2 and third outer conductor 3 are positioned on a second side face L1b in side faces parallel to the inner opposing direction of the multilayer body L1 to be explained later, i.e., the second side face L1b that is a side face extending along the longitudinal direction of side faces L1c, L1d orthogonal to the inner opposing direction of the multilayer body L1 while opposing the first side face L1a. The second outer conductor 2 and third outer conductor 3 are formed such that the second outer conductor 2 and third outer conductor 3 are arranged successively from the left side to right side of FIG. 1.

Thus, two outer conductors (the first outer conductor 1 and fourth outer conductor 4) among the four outer conductors (the first to fourth outer conductors 1 to 4) are positioned on the first side face L1a of the multilayer body L1, whereas the remaining two outer conductors (the second outer conductor 2 and third outer conductor 3) are positioned on the second side face L1b opposing the first side face L1a.

The two outer conductors (first and second outer conductors 1, 2) formed on the first side face L1a of the multilayer body L1 and the remaining two outer conductors (third and fourth outer conductors 3,4) formed on the second side face L1b are located at respective positions opposing each other in a direction along which the first side face L1a and second side face L1b oppose each other. Namely, the first outer conductor 1 is located at a position opposing the second outer conductor 2 in the opposing direction of the first side face L1a and second side face L1b in the multilayer body L1. On the other hand, the second outer conductor 2 is located at a position opposing the first outer conductor 1 in the opposing direction of the first side face L1a and second side face L1b in the multilayer body L1.

The third outer conductor 3 is located at a position opposing the fourth outer conductor 4 in the opposing direction of the first side face L1a and second side face L1b in the multilayer body L1. On the other hand, the fourth outer conductor 4 is located at a position opposing the third outer conductor 3 in the opposing direction of the first side face L1a and second side face L1b in the multilayer body L1.

As shown in FIG. 2, the multilayer body L1 is formed by laminating a plurality of (9 in this embodiment) dielectric layers 11 to 19. In the multilayer body L1, a plurality of (3 each in this embodiment) first and second inner conductors 31 to 33, 41 to 43 are included such as have respective regions opposing each other with at least one of dielectric layers 14 to 18 in between. In the actual multilayer capacitor C1, the dielectric layers 11 to 19 are integrated to such an extent that no boundaries are discernible therebetween. Further, a third inner conductor 51 and a fourth inner conductor 61 are laminated in the multilayer body L1.

The first inner conductors 31 to 33 include their corresponding first main portions 31A to 33A and lead portions 31B to 33B. Each of the first main portions 31A to 33A has a substantially rectangular form. The plurality of first main portions 31A to 33A are formed at respective positions separated by a predetermined distance from a side face parallel to a direction along which the respective first inner conductors 31 to 33 and the respective second inner conductors 41 to 43 oppose each other (hereinafter simply referred to as "inner opposing direction") in the multilayer body L1.

The lead portions 31B to 33B are formed such as to be taken out to the second side face L1b of the multilayer body L1 from their corresponding first main portions 31A to 33A. The lead portion 31B is integrally formed with the first main portion 31A, and extends therefrom so as to reach the second side face L1b of the multilayer body L1. The lead portion 32B is integrally formed with the first main portion 32A, and extends therefrom so as to reach the second side face L1b of the multilayer body L1. The lead portion 33B is integrally formed with the first main portion 33A, and extends therefrom so as to reach the second side face L1b of the multilayer body L1.

The first main portion 31A of the first inner conductor 31 is connected to the third outer conductor 3 through the lead portion 31B. The first main portion 32A of the first inner conductor 32 is connected to the third outer conductor 3 through the lead portion 32B. The first main portion 33A of the first inner conductor 33 is connected to the third outer conductor 3 through the lead portion 33B. As a consequence, the plurality of first inner conductors 31 to 33 are electrically connected to each other through the third outer conductor 3.

The second inner conductors 41 to 43 include their corresponding second main portions 41A to 43A and lead portions 41B to 43B. Each of the second main portions 41A to 43A has a substantially rectangular form. The plurality of second main portions 41A to 43A are formed at respective positions separated by a predetermined distance from a side face parallel to the inner opposing direction in the multilayer body L1.

The lead portions 41B to 43B are formed such as to be taken out to the second side face L1b of the multilayer body L1 from their corresponding second main portions 41A to 43A. The lead portion 41B is integrally formed with the second main portion 41A, and extends therefrom so as to reach the second side face L1b of the multilayer body L1. The lead portion 42B is integrally formed with the second main portion 42A, and extends therefrom so as to reach the second side face L1b of the multilayer body L1. The lead portion 43B is integrally formed with the second main portion 43A, and extends therefrom so as to reach the second side face L1b of the multilayer body L1.

The second main portion 41A of the second inner conductor 41 is connected to the second outer conductor 2 through the lead portion 41B. The second main portion 42A of the second inner conductor 42 is connected to the second outer conductor 2 through the lead portion 42B. The second main portion 43A of the second inner conductor 43 is connected to the second outer conductor 2 through the lead portion 43B. As a consequence, the plurality of second inner conductors 41 to 43 are electrically connected to each other through the second outer conductor 2.

The first and second inner conductors 31 to 33, 41 to 43 have respective regions (the first main portions 31A to 33A, second main portions 41A to 43A) opposing each other with respective one dielectric layers 14 to 18 in between. Therefore, the multilayer capacitor has a structure where each of the first and second inner conductors 31 to 33, 41 to 43 is capable of forming a capacity component.

The third inner conductor 51 and fourth inner conductor 61 have respective regions opposing each other with one dielectric layer 12 in between. Namely, the third inner conductor 51 is positioned so as to be held between the dielectric layers 11 and 12. The fourth inner conductor 61 is positioned so as to be held between the dielectric layers 12 and 13. The third inner conductor 51 and fourth inner conductor 61 are electrically insulated from each other.

The third and fourth inner conductors 51, 61 are laminated in the multilayer body L1 such that the multilayer body L1 includes at least one set (three sets in this embodiment) of first and second inner conductors arranged adjacent to each other with a dielectric layer in between in the inner opposing direction. Specifically, the third and fourth inner conductors 51, 61 are laminated in the multilayer body L1 such that the multilayer body L1 includes the first inner conductor 31 and second inner conductor 41 arranged adjacent to each other with the dielectric layer 14 in between, for example. The multilayer body L1 is required to include at least one set of first and second inner conductors 51, 61.

Figure 22:
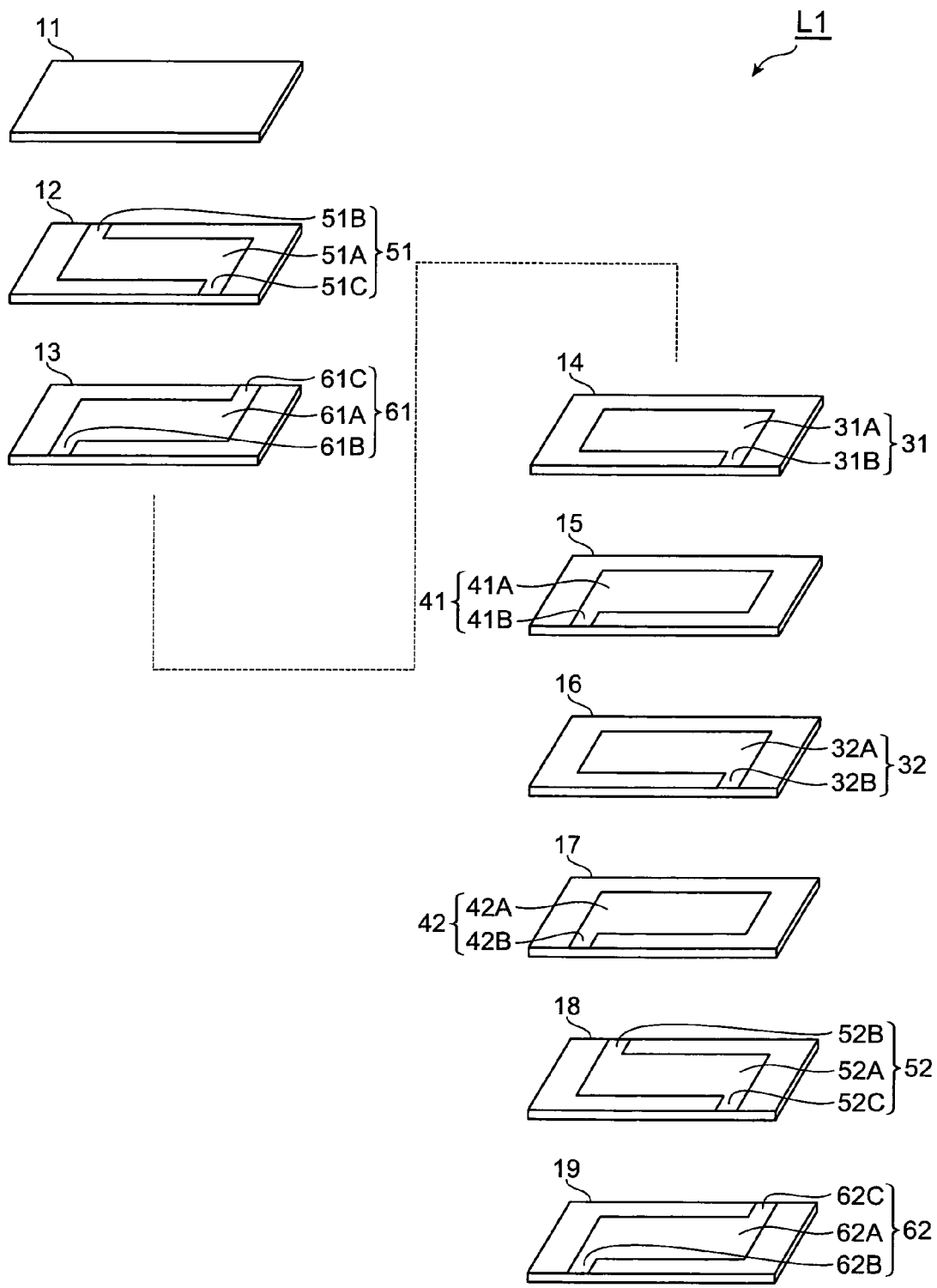
FIG. 22 is an exploded perspective view of the multilayer body included in the multilayer capacitor in accordance with a modification of the first embodiment.

It is preferable if the multilayer body 1 includes more than one set of first and second inner conductors 51, 61 to reduce equivalent series inductance of the multilayer capacitor C1. In that case, it is more preferable that almost half the sets of first and second inner conductors 51, 61 are positioned as the top inner conductors and the rest as the bottom inner conductors, so that the multilayer capacitor C1 can keep its equivalent series inductance independently of the mounting direction, and thus can be mounted easily. FIG. 22 shows the case where multilayer body 1 includes two sets of first and second inner conductors 51, 52, 61, 62 with one set (i.e., the first and second inner conductors 51, 61) positioned as the top inner conductors and the rest (i.e., the first and second inner conductors 52, 62) as the bottom. The third and forth inner conductors 33, 43 of FIG. 2 are replaced with the first and second inner conductors 52, 62 in FIG. 22.

The third inner conductor 51 includes a first conductor portion 51A having an oblong form, a second conductor portion 51B extending from the first conductor portion 51A so as to be taken out to the first side face L1a of the multilayer body L1, and a third conductor portion 51C extending from the first conductor portion 51A so as to be taken out to the second side face L1b of the multilayer body L1. The first conductor portion 51A is arranged such that its longitudinal direction is parallel to the first and second side faces L1a, L1b of the multilayer body L1.

The second conductor portion 51B of the third inner conductor 51 is connected to the first outer conductor 1. The third conductor portion 51C of the third inner conductor 51 is connected to the third outer conductor 3. As a consequence, the third inner conductor 51 is electrically connected to the first outer conductor 1 and third outer conductor 3.

The fourth inner conductor 61 includes a first conductor portion 61A having an oblong form, a second conductor portion 61B extending from the first conductor portion 61A so as to be taken out to the second side face L1b of the multilayer body L1, and a third conductor portion 61C extending from the first conductor portion 61A so as to be taken out to the first side face L1a of the multilayer body L1. The first conductor portion 61A is arranged such that its longitudinal direction is parallel to the first and second side faces L1a, L1b of the multilayer body L1.

The second conductor portion 61B of the fourth inner conductor 61 is connected to the second outer conductor 2. The third conductor portion 61C of the fourth inner conductor 61 is connected to the fourth outer conductor 4. As a consequence, the fourth inner conductor 61 is electrically connected to the second outer conductor 2 and fourth outer conductor 4.

The first conductor portion 51A of the third inner conductor 51 and the first conductor portion 61A of the fourth inner conductor 61 oppose each other with the dielectric layer 12 in between in the inner opposing direction in the multilayer body L1. Namely, the third inner conductor 51 and fourth inner conductor 61 have respective regions opposing each other with the dielectric layer 12 in between in the inner opposing direction in the multilayer body L1.

Figure 3:
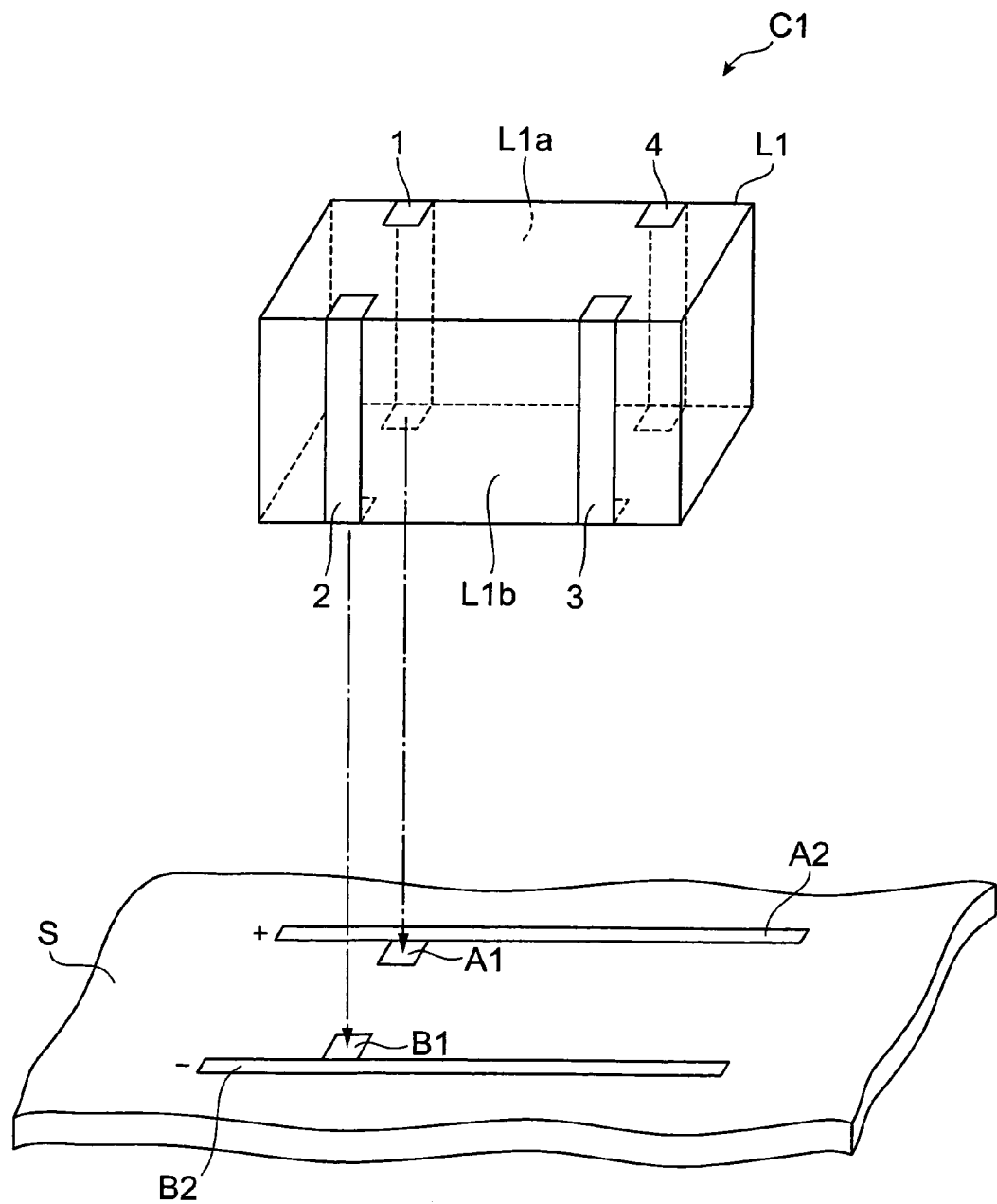
FIG. 3 is a view for explaining a state of mounting the multilayer capacitor in accordance with the first embodiment to a substrate.

A case where the multilayer capacitor C1 is mounted to a substrate S will be shown by way of example. FIG. 3 is a view for explaining a state of mounting the multilayer capacitor C1 to the substrate. FIG. 3 shows a state where the first outer conductor 1 and second outer conductor 2 are respectively connected to an anode land pattern A1 and a cathode land pattern B1 which are formed on the substrate S. FIG. 3 also shows a state where the anode land pattern A1 and cathode land pattern B1 are connected to leads A2 and B2, respectively, on the substrate S.

In this case, the first inner conductors 31 to 33 are not connected to an outer conductor (the first outer conductor 1 in this case) directly connected to a land pattern. On the other hand, the second inner conductors 41 to 43 are connected to an outer conductor (the second outer conductor 2 in this case) directly connected to a land pattern. As a consequence, only the second inner conductors 41 to 43, which are one of species of the first and second inner conductors having respective polarities different from each other, are connected to an outer conductor (the second outer conductor 2 in this case) directly connected to a land pattern.

Figure 4:
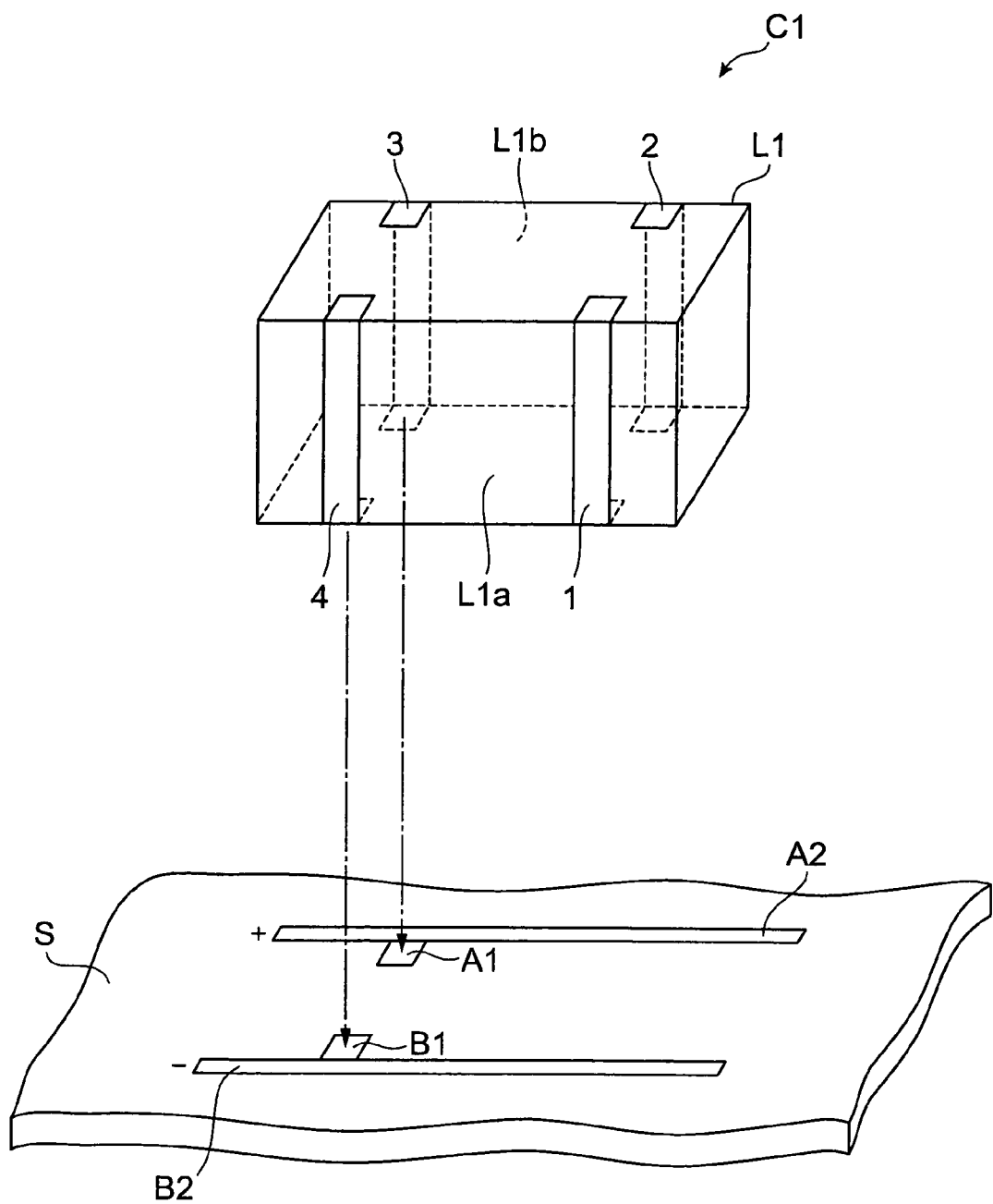
FIG. 4 is a view for explaining a state of mounting the multilayer capacitor in accordance with the first embodiment to the substrate in a mounting direction different from that of FIG. 3.

A case where the multilayer capacitor C1 is rotated by 180° on the substrate S from the state shown in FIG. 3 and is mounted to the substrate S as shown in FIG. 4 will now be studied. FIG. 4 shows a state where the third outer conductor 3 and fourth outer conductor 4 of the multilayer capacitor C1 are respectively connected to the anode land pattern A1 and cathode land pattern B1 formed on the substrate S.

Figure 5:
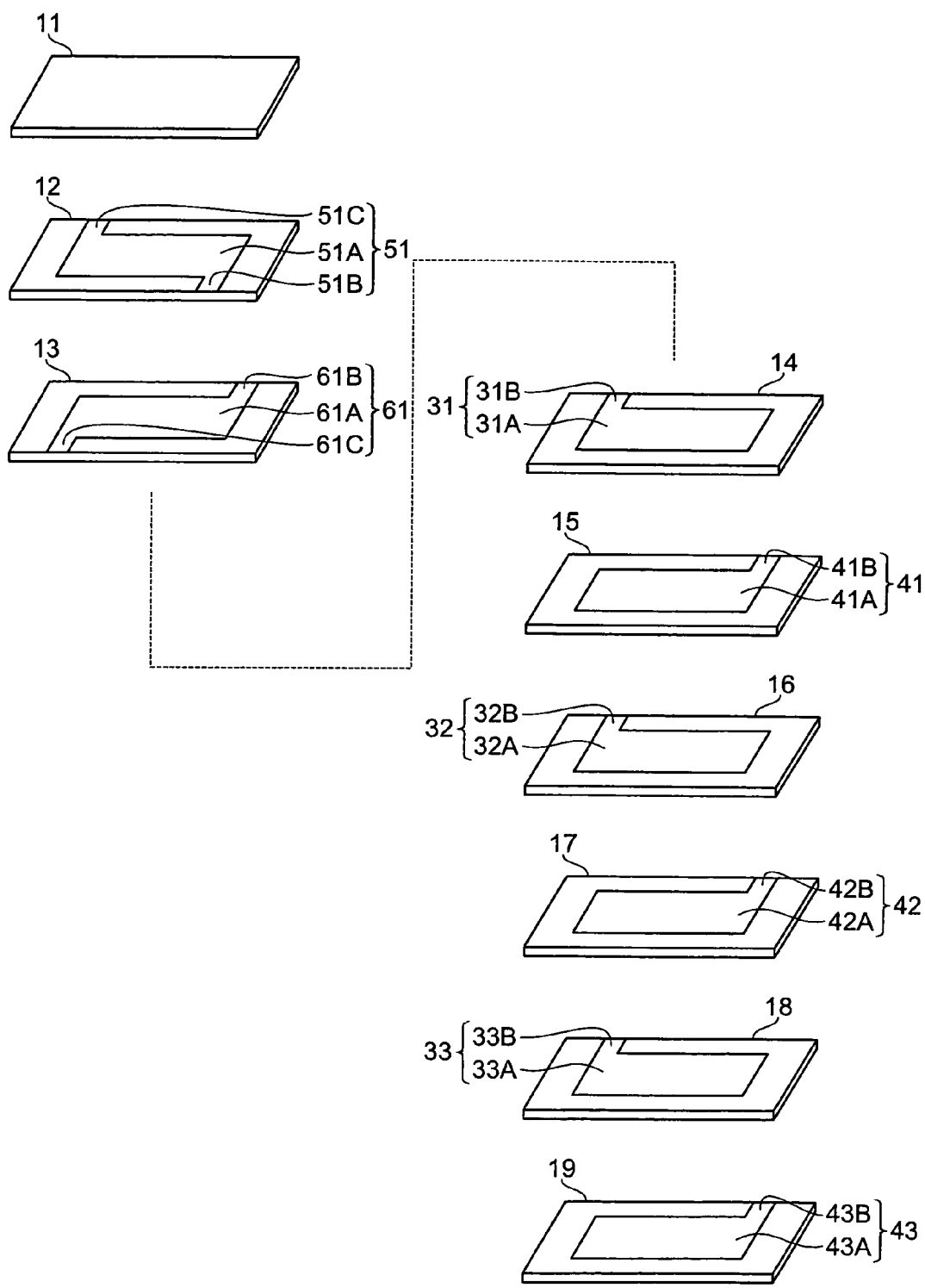
FIG. 5 is an exploded perspective view of the multilayer body included in the multilayer capacitor in accordance with the first embodiment shown in FIG. 4.

FIG. 5 is an exploded perspective view of the multilayer body L1 included in the multilayer capacitor C1 in the state mounted as shown in FIG. 4. The lateral and vertical directions of the multilayer body shown in FIG. 5 coincide with those of the multilayer capacitor C1 shown in FIG. 4. When the multilayer capacitor C1 is rotated by 180° so as to be mounted such that the third and fourth outer conductors 3, 4 are respectively connected to the land patterns A1, B1, as can be understood from FIGS. 4 and 5, the second outer conductor 2 connected to the lead portions 41B to 43B of the second inner conductors 41 to 43 becomes an outer conductor not connected to land patterns unlike the case of FIG. 3. On the other hand, the third outer conductor 3 connected to the lead portions 31B to 33B of the first inner conductors 31 to 33 becomes an outer conductor connected to a land pattern unlike the case of FIG. 3.

Therefore, when the multilayer capacitor C1 is mounted as shown in FIG. 4, the second inner conductors 41 to 43 are not connected to an outer conductor (the fourth outer conductor 4 in this case) directly connected to a land pattern. On the other hand, the first inner conductors 31 to 33 are connected to an outer conductor (the third outer conductor 3 in this case) directly connected to a land pattern. As a consequence, only the first inner conductors 31 to 33, which are one of species of the first and second inner conductors having respective polarities different from each other, are connected to an outer conductor (the third outer conductor 3 in this case) directly connected to a land pattern.

Figure 6:
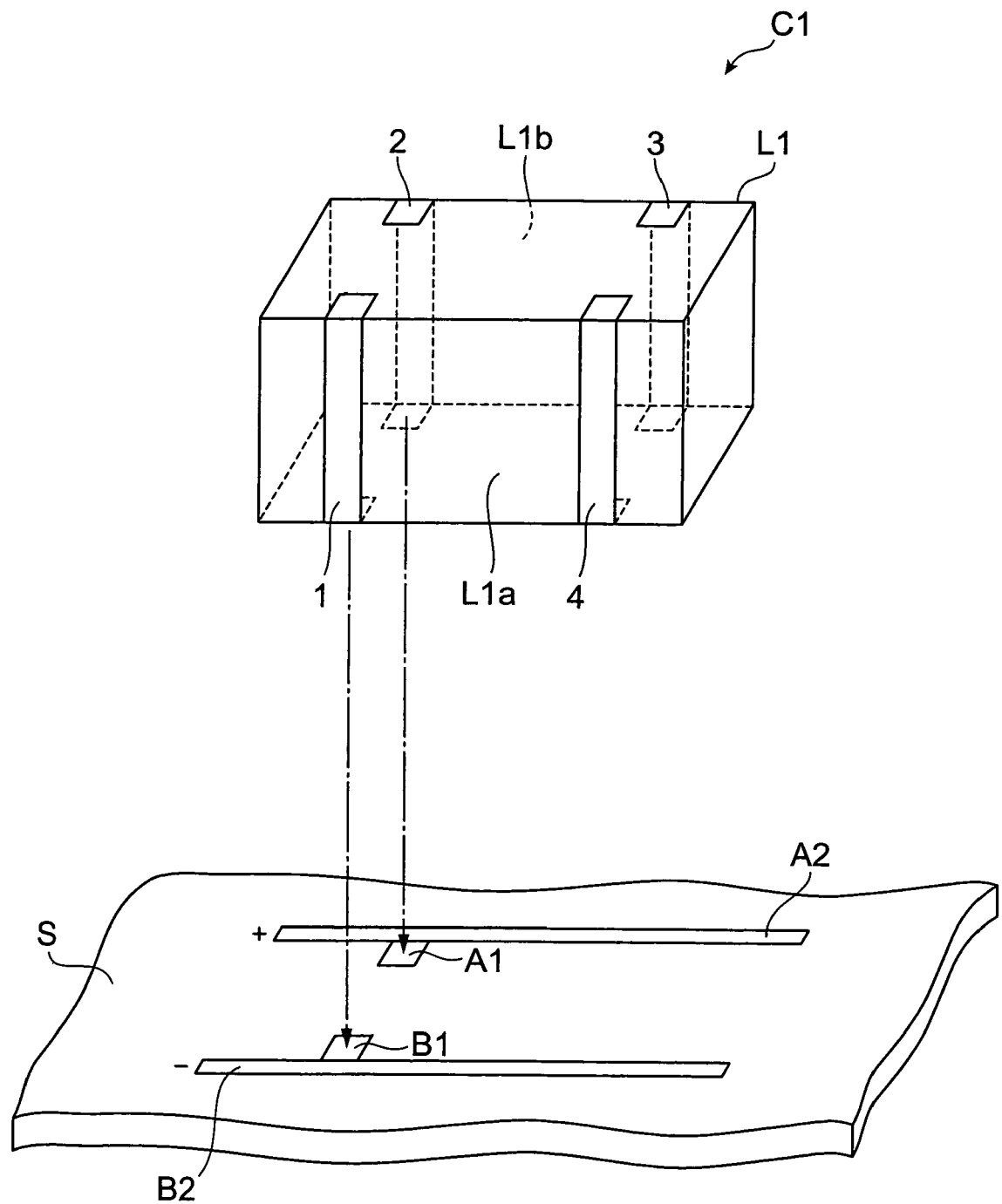
FIG. 6 is a view for explaining a state of mounting the multilayer capacitor in accordance with the first embodiment to the substrate in a mounting direction different from that of FIG. 3.

A case where the multilayer capacitor C1 is vertically reversed from the state shown in FIG. 3 and is mounted to the substrate S as shown in FIG. 6 will now be explained. FIG. 6 shows a state where the second outer conductor 2 and first outer conductor 1 of the multilayer capacitor C1 are respectively connected to the anode land pattern A1 and cathode land pattern B1 formed on the substrate S.

Figure 7:
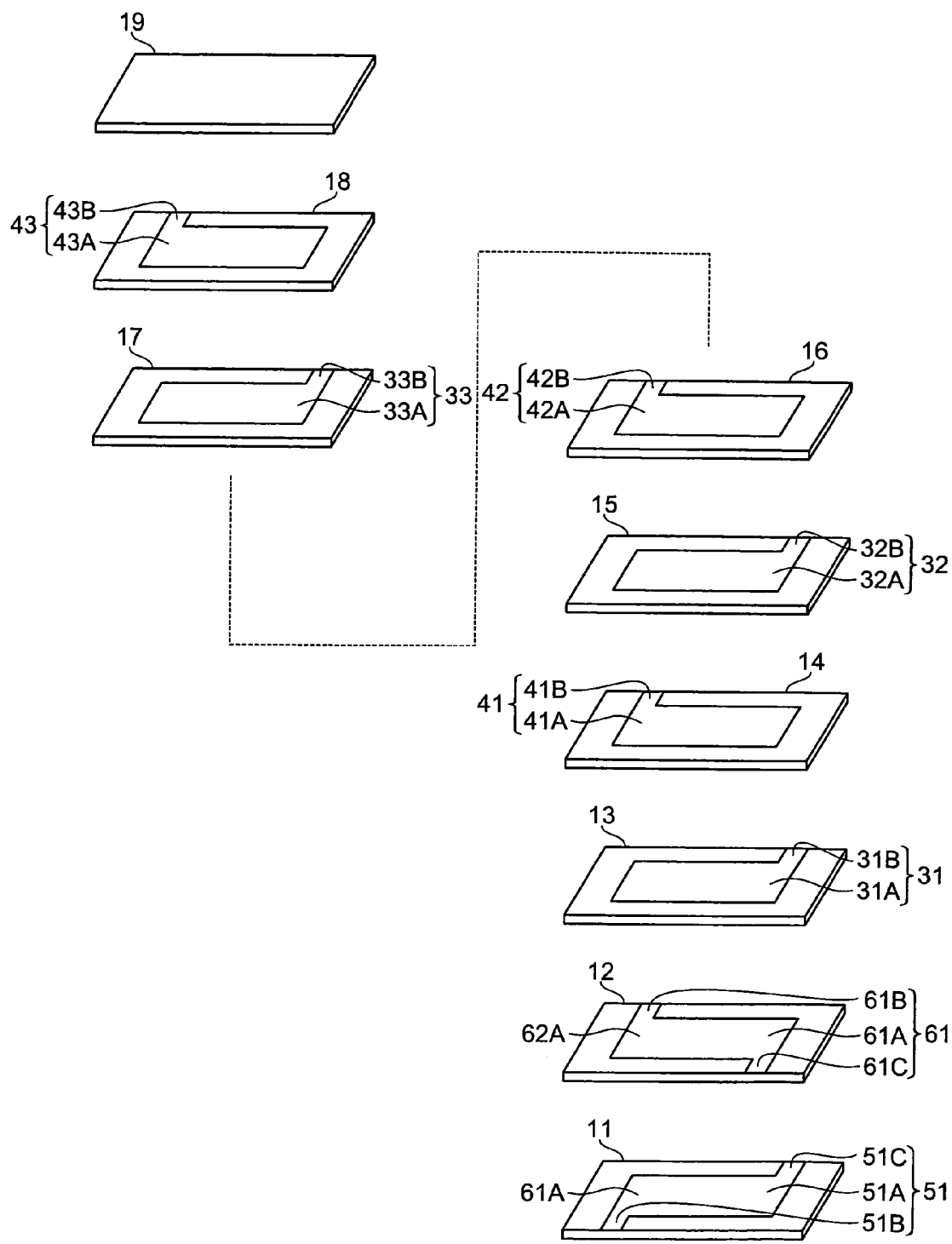
FIG. 7 is an exploded perspective view of the multilayer body included in the multilayer capacitor in accordance with the first embodiment shown in FIG. 6.

FIG. 7 is an exploded perspective view of the multilayer body L1 included in the multilayer capacitor C1 in the state mounted as shown in FIG. 6. The lateral and vertical directions of the multilayer body shown in FIG. 7 coincide with those of the multilayer capacitor C1 shown in FIG. 6. When the multilayer capacitor C1 is vertically reversed and is mounted such as to reverse the respective land patterns A1, B1 to which the first and second outer conductors 1, 2 are connected, as can be understood from FIGS. 6 and 7, the third outer conductor 3 connected to the lead portions 31B to 33B of the first inner conductors 31 to 33 becomes an outer conductor connected to no land patterns as in the case of FIG. 3. On the other hand, the second outer conductor 2 connected to the lead portions 41B to 43B of the second inner conductors 41 to 43 becomes an outer conductor connected to a land pattern as in the case of FIG. 3.

Therefore, when the multilayer capacitor C1 is mounted as shown in FIG. 6, the first inner conductors 31 to 33 are not connected to an outer conductor (the first outer conductor 1 in this case) directly connected to a land pattern. On the other hand, the second inner conductors 41 to 43 are connected to an outer conductor (the second outer conductor 2 in this case) directly connected to a land pattern. As a consequence, only the second inner conductors 41 to 43, which are one of species of the first and second inner conductors having respective polarities different from each other, are connected to an outer conductor (the second outer conductor 2 in this case) directly connected to a land pattern.

Figure 8:
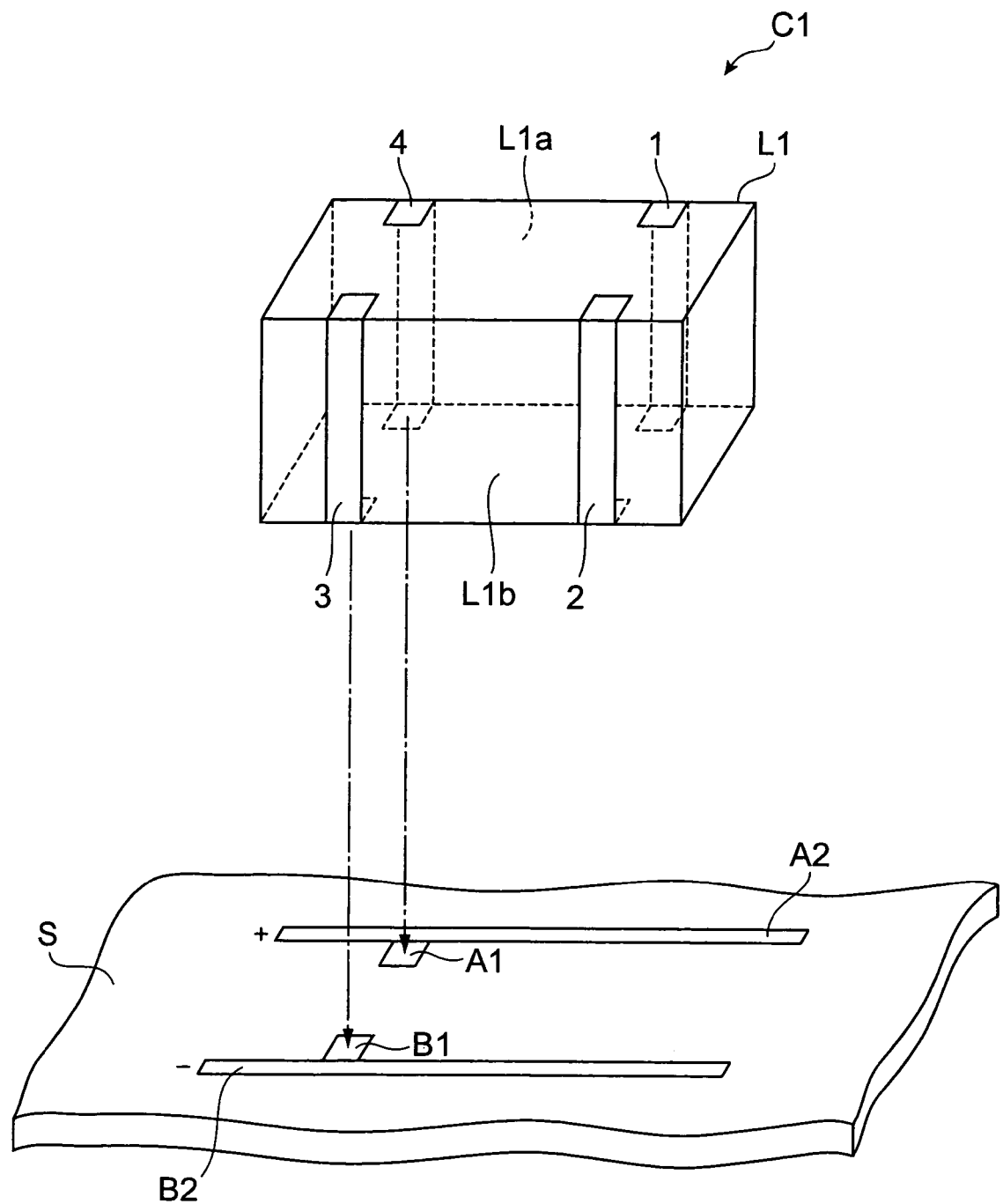
FIG. 8 is a view for explaining a state of mounting the multilayer capacitor in accordance with the first embodiment to the substrate in a mounting direction different from that of FIG. 3.

A state where the multilayer capacitor C1 is vertically reversed after being rotated by 180° on the substrate S from the state shown in FIG. 3 and is mounted to the substrate S as shown in FIG. 8 will now be explained. FIG. 8 shows a state where the third outer conductor 3 and fourth outer conductor 4 of the multilayer capacitor C1 are respectively connected to the cathode land pattern B1 and anode land pattern A1 formed on the substrate S.

Figure 9:
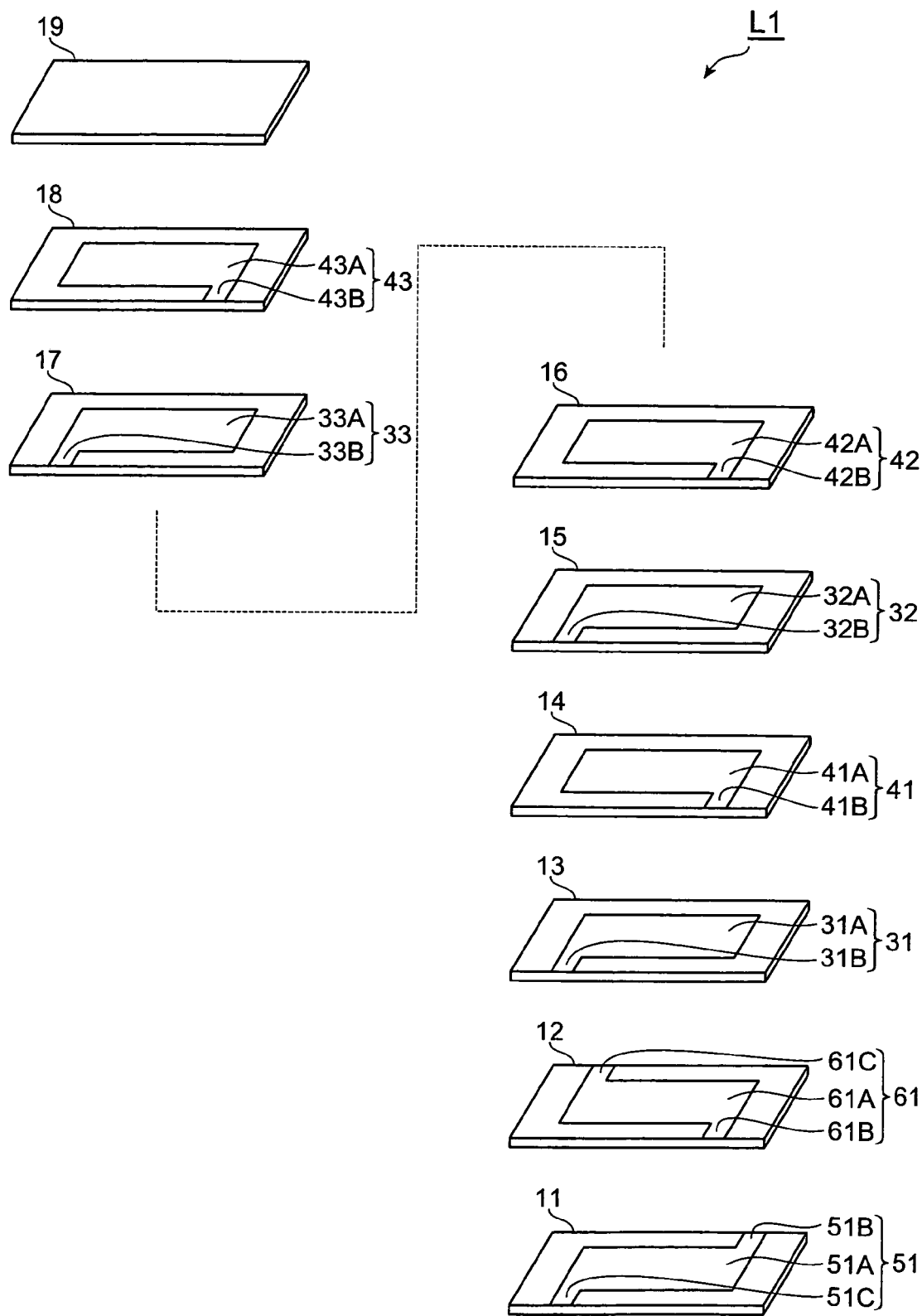
FIG. 9 is an exploded perspective view of the multilayer body included in the multilayer capacitor in accordance with the first embodiment shown in FIG. 8.

FIG. 9 is an exploded perspective view of the multilayer body L1 included in the multilayer capacitor C1 in the state mounted as shown in FIG. 8. The lateral and vertical directions of the multilayer body shown in FIG. 9 coincide with those of the multilayer capacitor C1 shown in FIG. 8. When the multilayer capacitor C1 is vertically reversed after being rotated by 180° and is mounted such that the third and fourth outer conductors 3, 4 are respectively connected to the land patterns B1, A1, as can be understood from FIGS. 8 and 9, the second outer conductor 2 connected to the lead portions 41B to 43B of the second inner conductors 41 to 43 becomes an outer conductor connected to no land patterns unlike the case of FIG. 3. On the other hand, the third outer conductor 3 connected to the lead portions 31B to 33B of the first inner conductors 31 to 33 becomes an outer conductor connected to a land pattern unlike the case of FIG. 3.

Therefore, when the multilayer capacitor C1 is mounted as shown in FIG. 8, the second inner conductors 41 to 43 are not connected to an outer conductor (the fourth outer conductor 4 in this case) directly connected to a land pattern. On the other hand, the first inner conductors 31 to 33 are connected to an outer conductor (the third outer conductor 3 in this case) directly connected to a land pattern. As a consequence, only the first inner conductors 31 to 33, which are one of species of the first and second inner conductors having respective polarities different from each other, are connected to an outer conductor (the third outer conductor 3 in this case) directly connected to a land pattern.

In the multilayer capacitor C1, the first inner conductors 31 to 33 are directly connected to the third outer conductor 3. As a consequence, the first inner conductors 31 to 33 are electrically connected to the first outer conductor 1 through the third outer conductor 3 and third inner conductor 51. The second inner conductors 41 to 43 are directly connected to the second outer conductor 2. As a consequence, the second inner conductors 41 to 43 are electrically connected to the fourth outer conductor 4 through the second outer conductor 2 and fourth inner conductor 61. Therefore, as compared with the conventional multilayer capacitor in which all the first and second inner conductors are directly connected to outer conductors connected to land patterns, the multilayer capacitor C1 can yield a greater equivalent series resistance when mounted such that the first and second outer conductors 1, 2 or the third and fourth outer conductors 3, 4 are connected land patterns of a substrate or the like.

In particular, the multilayer capacitor C1 can set the number of outer conductors connected to no land patterns to 2, and thus can further increase the equivalent series resistance as compared with a capacitor in which the number of outer conductors connected to no land patterns is 3 or greater.

Since the equivalent series resistance is regulated by the third inner conductor 51 or fourth inner conductor 61, the multilayer capacitor C1 can increase its capacitance while raising equivalent series resistance by employing a greater number of laminated first and second inner conductors 31 to 33, 41 to 43 capable of forming a capacity component.

In the first and second inner conductors 31 to 33, 41 to 43 capable of forming the capacity component of the multilayer capacitor C1, the second inner conductors 41 to 43 are connected to an outer conductor (the second outer conductor 2 in this case) connected to a land pattern when the multilayer capacitor C1 is mounted as shown in FIG. 3 or 6. On the other hand, the first inner conductors 31 to 33 are connected to an outer conductor (the third outer conductor 3 in this case) connected to a land pattern when the multilayer capacitor C1 is mounted as shown in FIG. 4 or 8. Namely, even when the multilayer capacitor C1 is rotated by 180° or vertically reversed, for example, so as to change its mounting direction, only one species in the first and second inner conductors 31 to 33, 41 to 43 capable of forming the capacity component of the multilayer capacitor C1 are connected to an outer conductor directly connected to a land pattern. Therefore, the multilayer capacitor C1 can increase its equivalent series resistance independently of the mounting direction, and thus can be mounted easily.

The multilayer capacitor C1 is effective in increasing the equivalent series resistance by connecting only two outer conductors (e.g., the first and second outer conductors 1, 2) to land patterns on a substrate or the like. As a consequence, the structure of land patterns formed on a mounting substrate or the like becomes simpler than that in the case where three or more outer conductors are connected to land patterns on the substrate or the like. Therefore, the substrate circuit wiring on the mounting substrate can be simplified.

Both of the first outer conductor 1 and fourth outer conductor 4 are formed on the first side face L1a of the multilayer body L1. Both of the second outer conductor 2 and third outer conductor 3 are formed on the second side face L1b of the multilayer body L1 opposing the first side face L1a. Thus, all of the first to fourth outer conductors 1 to 4 are formed on two side faces L1a, L1b opposing each other in the multilayer body L1 in the multilayer capacitor C1. Therefore, the multilayer capacitor C1 can reduce the steps required for forming outer conductors as compared with the case where outer conductors are formed on three or more side faces (e.g., four side faces) of the multilayer body. As a consequence, the multilayer capacitor C1 can be made easily.

In the multilayer capacitor, the first outer conductor 1 and third outer conductor 3 are formed on the first side face L1a and second side face L1b of the multilayer body L1, respectively. On the other hand, the second outer conductor 2 and fourth outer conductor 4 are formed on the second side face L1b and first side face L1a of the multilayer body L1, respectively. The first conductor portion 51A of the third inner conductor 51 and the first conductor portion 61A of the fourth inner conductor 61 oppose each other with the dielectric layer 12 in between in the inner opposing direction in the multilayer body L1. Consequently, in the multilayer capacitor C1, a magnetic field generated by a current flowing through the third inner conductor 51 and a magnetic field generated by a current flowing through the fourth inner conductor 61 cancel each other out. As a result, the multilayer capacitor C1 can reduce its equivalent series inductance.

The third and fourth inner conductors 51, 61 have respective regions 51A, 61A opposing each other with the dielectric layer 12 in between in the inner opposing direction in the multilayer body L1. The third and fourth inner conductors 51, 61 have respective polarities different from each other, and thus can contribute to forming a capacity component. Therefore, the multilayer capacitor C1 can further increase its capacitance.

Second Embodiment

Figure 10:
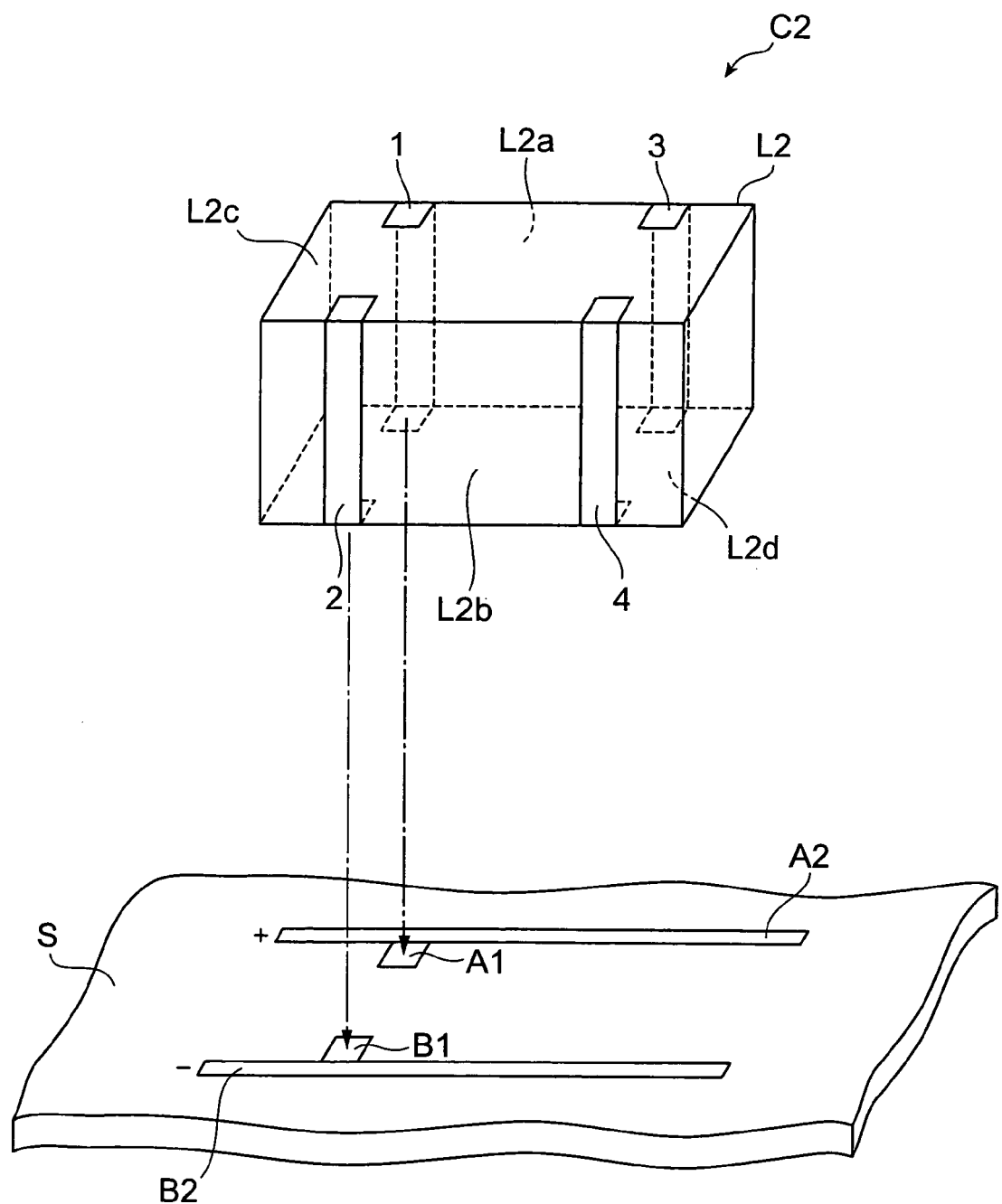
FIG. 10 is a perspective view of the multilayer capacitor in accordance with a second embodiment.
Figure 11:
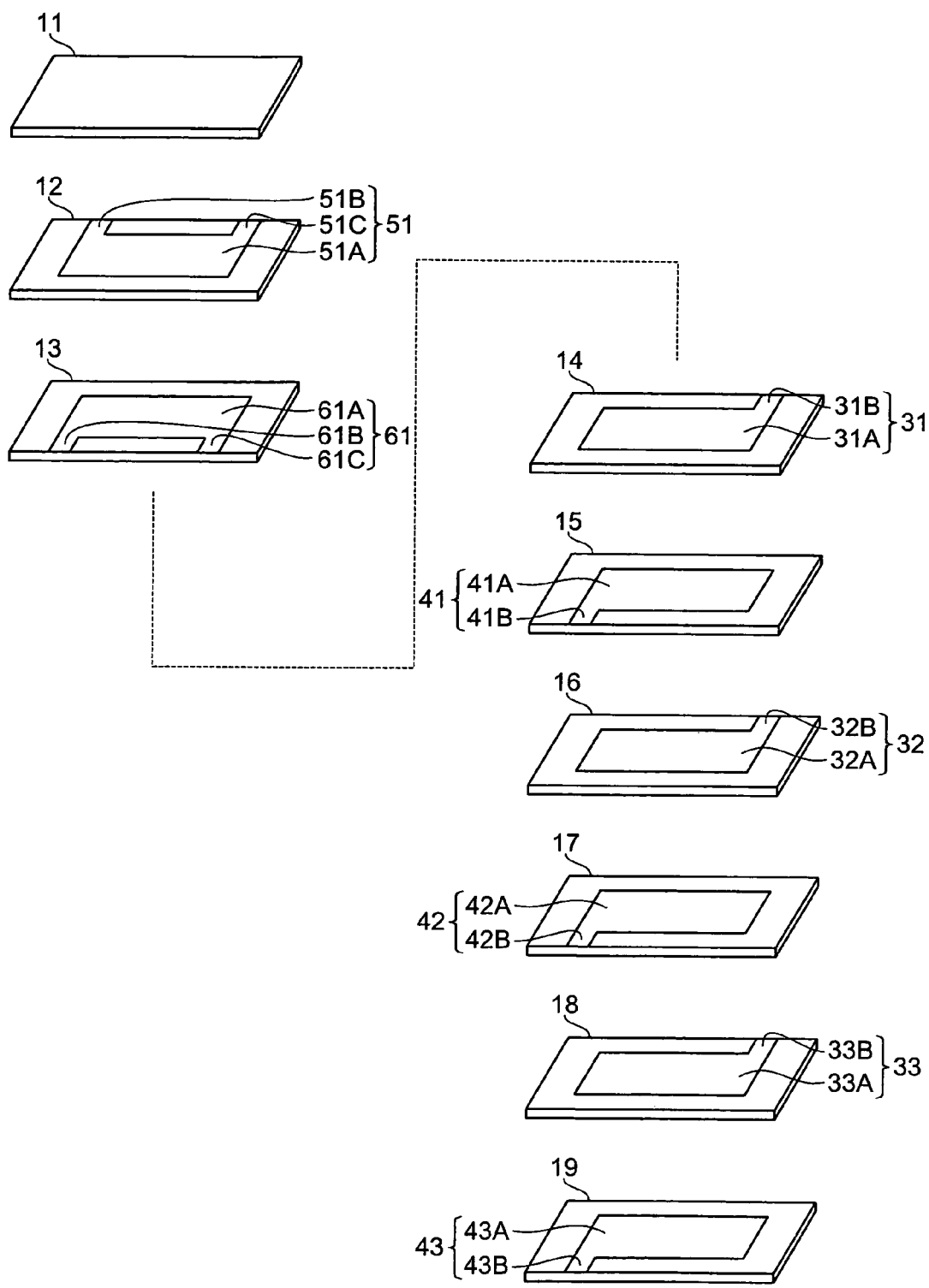
FIG. 11 is an exploded perspective view of the multilayer body included in the multilayer capacitor in accordance with the second embodiment.

With reference to FIGS. 10 and 11, the structure of the multilayer capacitor in accordance with a second embodiment will be explained. The multilayer capacitor in accordance with the second embodiment differs from the multilayer capacitor C1 in accordance with the first embodiment in terms of the arrangement of outer conductors in the multilayer body. FIG. 10 is a perspective view of the multilayer capacitor in accordance with the second embodiment. FIG. 11 is an exploded perspective view of the multilayer body included in the multilayer capacitor in accordance with the second embodiment.

As shown in FIG. 10, the multilayer capacitor C2 in accordance with the second embodiment comprises a multilayer body L2 having a substantially rectangular parallelepiped form, and four outer conductors formed on side faces of the multilayer body L2. The four outer conductors are a first outer conductor 1, a second outer conductor 2, a third outer conductor 3, and a fourth outer conductor 4. The four outer conductors are formed so as to be electrically insulated from each other on the surface of the multilayer body L2.

Both of the first outer conductor 1 and third outer conductor 3 are positioned on a first side face L2a in side faces parallel to an inner opposing direction of the multilayer body L2 which will be explained later, i.e., the first side face L2a that is a side face extending along the longitudinal direction of side faces L2c, L2d orthogonal to the inner opposing direction of the multilayer body L2. The first outer conductor 1 and third outer conductor 3 are formed such that the first outer conductor 1 and third outer conductor 3 are arranged successively from the left side to right side of FIG. 10.

Both of the second outer conductor 2 and fourth outer conductor 4 are positioned on a second side face L2b in side faces parallel to the inner opposing direction of the multilayer body L2 to be explained later, i.e., the second side face L2b that is a side face extending along the longitudinal direction of side faces L2c, L2d orthogonal to the inner opposing direction while opposing the first side face L2a. The second outer conductor 2 and fourth outer conductor 4 are formed such that the second outer conductor 2 and fourth outer conductor 4 are arranged successively from the left side to right side of FIG. 10.

Thus, two outer conductors (the first outer conductor 1 and third outer conductor 3) among the four outer conductors (the first to fourth outer conductors 1 to 4) are positioned on the first side face L2a of the multilayer body L2, whereas the remaining two outer conductors (the second outer conductor 2 and fourth outer conductor 4) are positioned on the second side face L2b opposing the first side face L2a.

The two outer conductors (first and third outer conductors 1, 3) formed on the first side face L2a of the multilayer body L2 and the remaining two outer conductors (second and fourth outer conductors 2, 4) formed on the second side face L2b are located at respective positions opposing each other in a direction along which the first side face L2a and second side face L2b oppose each other. Namely, the second outer conductor 2 is located at a position opposing the first outer conductor 1 in the opposing direction of the first side face L2a and second side face L2b in the multilayer body L2. The fourth outer conductor 4 is located at a position opposing the third outer conductor 3 in the opposing direction of the first side face L2a and second side face L2b in the multilayer body L2.

As shown in FIG. 11, the multilayer body L2 is formed by laminating a plurality of (9 in this embodiment) dielectric layers 11 to 19. In the multilayer body L2, a plurality of (3 each in this embodiment) first and second inner conductors 31 to 33, 41 to 43 are included such as have respective regions opposing each other with at least one of dielectric layers 14 to 18 in between.

The first inner conductors 31 to 33 include their corresponding first main portions 31A to 33A and lead portions 31B to 33B. Each of the first main portions 31A to 33A has a substantially rectangular form. The plurality of first main portions 31A to 33A are formed at respective positions separated by a predetermined distance from a side face parallel to a direction along which the respective first inner conductors 31 to 33 and the respective second inner conductors 41 to 43 oppose each other (hereinafter simply referred to as "inner opposing direction") in the multilayer body L2.

The lead portions 31B to 33B are formed such as to be taken out to the first side face L2a of the multilayer body L2 from their corresponding first main portions 31A to 33A. The lead portion 31B is integrally formed with the first main portion 31A, and extends therefrom so as to reach the first side face L2a of the multilayer body L2. The lead portion 32B is integrally formed with the first main portion 32A, and extends therefrom so as to reach the first side face L2a of the multilayer body L2. The lead portion 33B is integrally formed with the first main portion 33A, and extends therefrom so as to reach the first side face L2a of the multilayer body L2.

The first main portions 31A, 32A, 33A of the first inner conductors 31, 32, 33 are connected to the third outer conductor 3 through the lead portions 31B, 32B, 33B, respectively. As a consequence, the plurality of first inner conductors 31 to 33 are electrically connected to each other through the third outer conductor 3.

The second inner conductors 41 to 43 include their corresponding second main portions 41A to 43A and lead portions 41B to 43B. Each of the second main portions 41A to 43A has a substantially rectangular form. The plurality of second main portions 41A to 43A are formed at respective positions separated by a predetermined distance from a side face parallel to the inner opposing direction in the multilayer body L2.

The lead portions 41B to 43B are formed such as to be taken out to the second side face L2b of the multilayer body L2 from their corresponding second main portions 41A to 43A. The lead portion 41B is integrally formed with the second main portion 41A, and extends therefrom so as to reach the second side face L2b of the multilayer body L2. The lead portion 42B is integrally formed with the second main portion 42A, and extends therefrom so as to reach the second side face L2b of the multilayer body L2. The lead portion 43B is integrally formed with the second main portion 43A, and extends therefrom so as to reach the second side face L2b of the multilayer body L2.

The second main portions 41A, 42A, 43A of the second inner conductors 41, 42, 43 are connected to the second outer conductor 2 through the lead portions 41B, 42B, 43B, respectively. As a consequence, the plurality of second inner conductors 41 to 43 are electrically connected to each other through the second outer conductor 2.

A third inner conductor 51 and a fourth inner conductor 61 are laminated adjacent to each other with the dielectric layer 12 in between in the inner opposing direction in the multilayer body L2. The third inner conductor 51 and fourth inner conductor 61 have respective regions opposing each other with one dielectric layer 12 in between. The third inner conductor 51 and fourth inner conductor 61 are electrically insulated from each other.

The third inner conductor 51 includes a first conductor portion 51A having an oblong form, a second conductor portion 51B extending from the first conductor portion 51A so as to be taken out to the first side face L2a of the multilayer body L2, and a third conductor portion 51C extending from the first conductor portion 51A so as to be taken out to the first side face L2a of the multilayer body L2. The first conductor portion 51A is arranged such that its longitudinal direction is parallel to the first and second side faces L2a, L2b of the multilayer body L2.

The second conductor portion 51B of the third inner conductor 51 is connected to the first outer conductor 1. The third conductor portion 51C of the third inner conductor 51 is connected to the third outer conductor 3. As a consequence, the third inner conductor 51 is electrically connected to the first outer conductor 1 and third outer conductor 3.

The fourth inner conductor 61 includes a first conductor portion 61A having an oblong form, a second conductor portion 61B extending from the first conductor portion 61A so as to be taken out to the second side face L2b of the multilayer body L2, and a third conductor portion 61C extending from the first conductor portion 61A so as to be taken out to the second side face L2b of the multilayer body L2. The first conductor portion 61A is arranged such that its longitudinal direction is parallel to the first and second side faces L2a, L2b of the multilayer body L2.

The second conductor portion 61B of the fourth inner conductor 61 is connected to the second outer conductor 2. The third conductor portion 61C of the fourth inner conductor 61 is connected to the fourth outer conductor 4. As a consequence, the fourth inner conductor 61 is electrically connected to the second outer conductor 2 and fourth outer conductor 4.

The first conductor portion 51A of the third inner conductor 51 and the first conductor portion 61A of the fourth inner conductor 61 oppose each other with the dielectric layer 12 in between in the opposing direction in the multilayer body L2. Namely, the third inner conductor 51 and fourth inner conductor 61 have respective regions opposing each other with the dielectric layer 12 in between in the opposing direction in the multilayer body L2.

In the multilayer capacitor C2, the first inner conductors 31 to 33 are electrically connected to the first outer conductor 1 through the third outer conductor 3 and third inner conductor 51. The second inner conductors 41 to 43 are electrically connected to the fourth outer conductor 4 through the second outer conductor 2 and fourth inner conductor 61. As a consequence, either when the set of the first and second outer conductors 1, 2 or the set of the third and fourth outer conductors 3, 4 is connected to land patterns of a substrate or the like, the multilayer capacitor C2 can yield an equivalent series resistance greater than that of the conventional multilayer capacitor in which all the first and second inner conductors are connected to outer conductors connected to land patterns.

In particular, the multilayer capacitor C2 can set the number of outer conductors connected to no land patterns to 2, and thus can further increase the equivalent series resistance as compared with a capacitor in which the number of outer conductors connected to no land patterns is 3 or greater.

Since the equivalent series resistance is regulated by the third inner conductor 51 or fourth inner conductor 61, the multilayer capacitor C2 can increase its capacitance while raising equivalent series resistance by employing a greater number of laminated first and second inner conductors 31 to 33, 41 to 43 capable of forming a capacity component.

In the first and second inner conductors 31 to 33, 41 to 43 capable of forming the capacity component, only one species of inner conductors are connected to outer conductors connected to a land pattern of a substrate or the like no matter in which direction the multilayer capacitor C2 is mounted to the substrate or the like. Therefore, the multilayer capacitor C2 can increase its equivalent series resistance independently of the mounting direction, and thus can be mounted easily.

By connecting two outer conductors to land patterns, the multilayer capacitor C2 can yield a desirable effect (of increasing the equivalent series resistance and the like). Thus, it is sufficient for the multilayer capacitor C2 to connect two outer conductors to the substrate, whereby the circuit wiring on the mounting substrate can be simplified.

All the outer conductors (first to fourth outer conductors 1 to 4) in the multilayer capacitor C2 are formed on the first and second side faces L2a, L2b of the multilayer body L2 opposing each other. Therefore, as compared with the case where outer conductors are formed on three or more side faces (e.g., four side faces) of the multilayer body, the steps required for forming the outer conductors can be reduced. As a consequence, the multilayer capacitor C2 can be made easily.

In the multilayer capacitor, the first outer conductor 1 and third outer conductor 3 are formed on the first side face L2a of the multilayer body L2. On the other hand, the second outer conductor 2 and fourth outer conductor 4 are formed on the second side face L2b of the multilayer body L2. The first conductor portion 51A of the third inner conductor 51 and the first conductor portion 61A of the fourth inner conductor 61 oppose each other with the dielectric layer 12 in between in the inner opposing direction in the multilayer body L2. Consequently, in the multilayer capacitor C2, a magnetic field generated by a current flowing through the third inner conductor 51 and a magnetic field generated by a current flowing through the fourth inner conductor 61 cancel each other out. As a result, the multilayer capacitor C2 can reduce its equivalent series inductance.

The third and fourth inner conductors 51, 61 have respective regions opposing each other with the dielectric layer 12 in between in the inner opposing direction in the multilayer body L2. Therefore, the multilayer capacitor C2 can further increase its capacitance.

Third Embodiment

Figure 12:
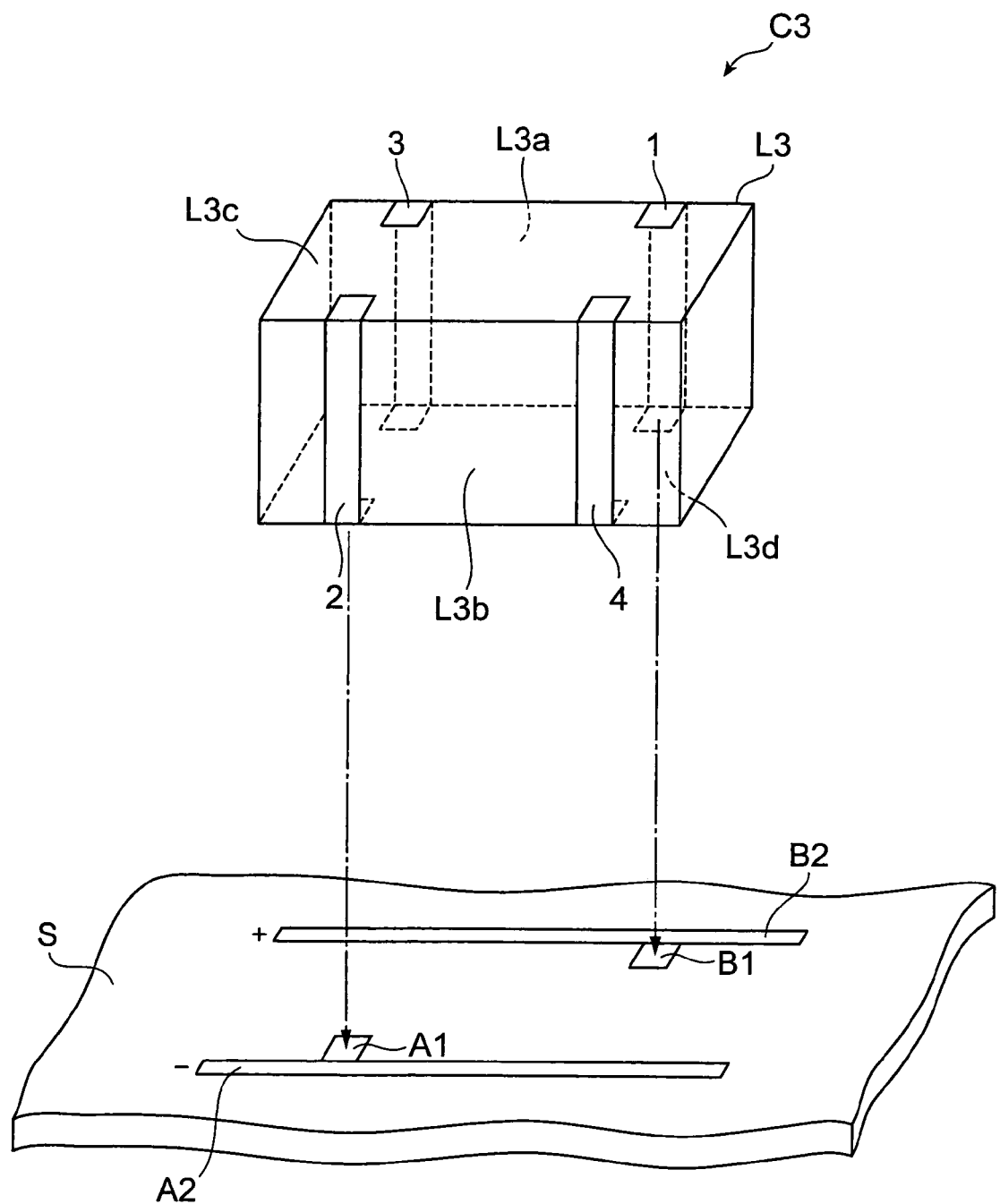
FIG. 12 is a perspective view of the multilayer capacitor in accordance with a third embodiment.
Figure 13:
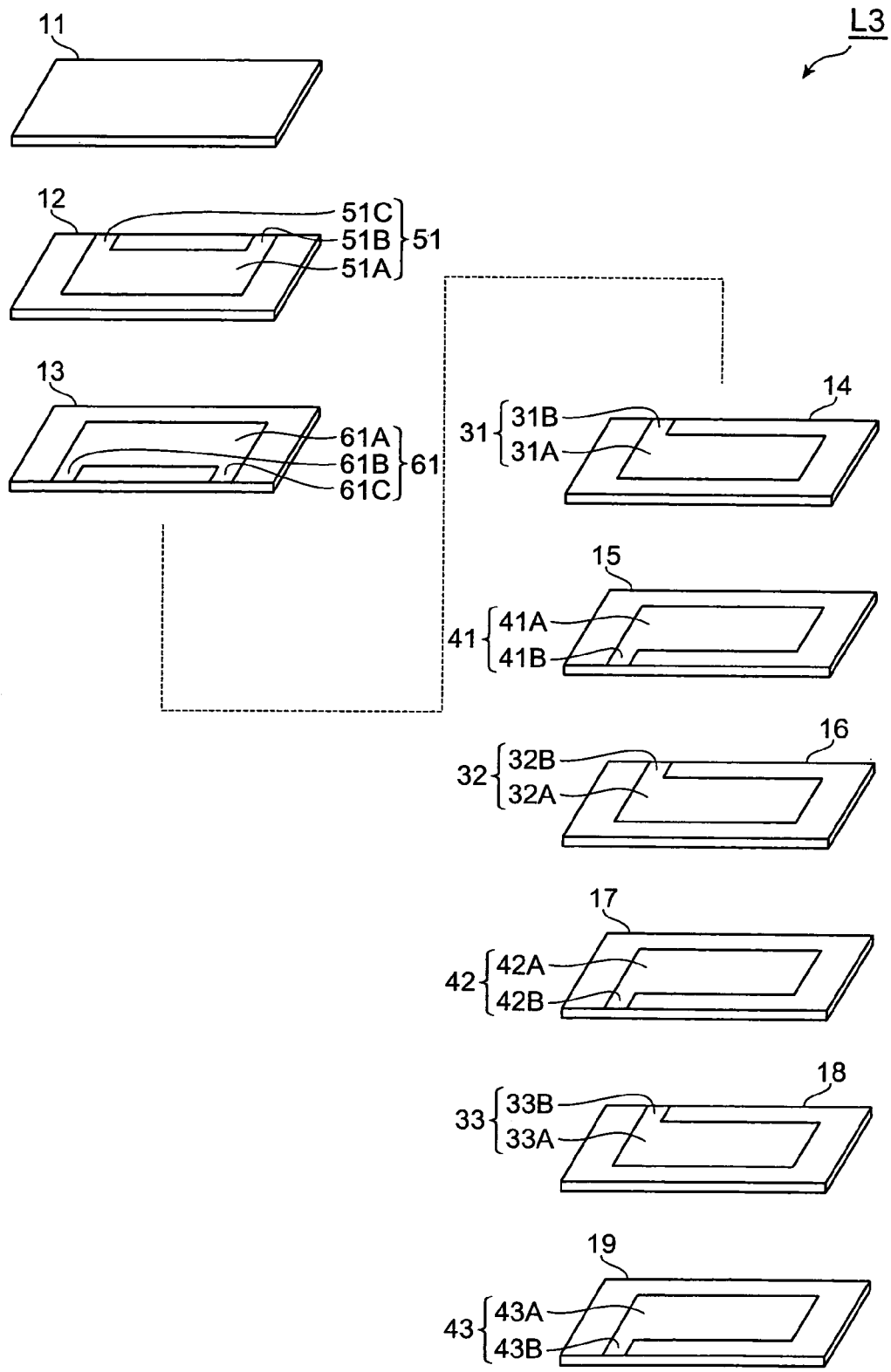
FIG. 13 is an exploded perspective view of the multilayer body included in the multilayer capacitor in accordance with the third embodiment.

With reference to FIGS. 12 and 13, the structure of the multilayer capacitor in accordance with a third embodiment will be explained. The multilayer capacitor in accordance with the third embodiment differs from the multilayer capacitor C1 in accordance with the first embodiment in terms of the arrangement of outer conductors in the multilayer body. FIG. 12 is a perspective view of the multilayer capacitor in accordance with the third embodiment. FIG. 13 is an exploded perspective view of the multilayer body included in the multilayer capacitor in accordance with the third embodiment.

As shown in FIG. 12, the multilayer capacitor C3 in accordance with the third embodiment comprises a multilayer body L3 having a substantially rectangular parallelepiped form, and four outer conductors formed on side faces of the multilayer body L3. The four outer conductors are a first outer conductor 1, a second outer conductor 2, a third outer conductor 3, and a fourth outer conductor 4. The four outer conductors are formed so as to be electrically insulated from each other on the surface of the multilayer body L3.

Both of the first outer conductor 1 and third outer conductor 3 are positioned on a first side face L3a in side faces parallel to an inner opposing direction of the multilayer body L3 which will be explained later, i.e., the first side face L3a that is a side face extending along the longitudinal direction of side faces L3c, L3d orthogonal to the inner opposing direction of the multilayer body L3. The first outer conductor 1 and third outer conductor 3 are formed such that the third outer conductor 3 and first outer conductor 1 are arranged successively from the left side to right side of FIG. 12.

Both of the second outer conductor 2 and fourth outer conductor 4 are positioned on a second side face L3b in side faces parallel to the inner opposing direction of the multilayer body L3 to be explained later, i.e., the second side face L3b that is a side face extending along the longitudinal direction of side faces L3c, L3d orthogonal to the inner opposing direction while opposing the first side face L3a. The second outer conductor 2 and fourth outer conductor 4 are formed such that the second outer conductor 2 and fourth outer conductor 4 are arranged successively from the left side to right side of FIG. 12.

Thus, two outer conductors (the first outer conductor 1 and third outer conductor 3) among the four outer conductors (the first to fourth outer conductors 1 to 4) are positioned on the first side face L3a of the multilayer body L3, whereas the remaining two outer conductors (the second outer conductor 2 and fourth outer conductor 4) are positioned on the second side face L3b opposing the first side face L3a.

The two outer conductors (first and third outer conductors 1, 3) formed on the first side face L3a of the multilayer body L3 and the remaining two outer conductors (second and fourth outer conductors 2, 4) formed on the second side face L3b are located at respective positions opposing each other in a direction along which the first side face L3a and second side face L3b oppose each other. Namely, the fourth outer conductor 4 is located at a position opposing the first outer conductor 1 in the opposing direction of the first side face L3a and second side face L3b in the multilayer body L3. The third outer conductor 3 is located at a position opposing the second outer conductor 2 in the opposing direction of the first side face L3a and second side face L3b in the multilayer body L3.

As shown in FIG. 13, the multilayer body L3 is formed by laminating a plurality of (9 in this embodiment) dielectric layers 11 to 19. In the multilayer body L3, a plurality of (3 each in this embodiment) first and second inner conductors 31 to 33, 41 to 43 are included such as have respective regions opposing each other with at least one of dielectric layers 14 to 18 in between.

The first inner conductors 31 to 33 include their corresponding first main portions 31A to 33A and lead portions 31B to 33B. Each of the first main portions 31A to 33A has a substantially rectangular form. The plurality of first main portions 31A to 33A are formed at respective positions separated by a predetermined distance from a side face parallel to a direction along which the respective first inner conductors 31 to 33 and the respective second inner conductors 41 to 43 oppose each other (hereinafter simply referred to as "inner opposing direction") in the multilayer body L3.

The lead portions 31B to 33B are formed such as to be taken out to the first side face L3a of the multilayer body L3 from their corresponding first main portions 31A to 33A. The lead portion 31B is integrally formed with the first main portion 31A, and extends therefrom so as to reach the first side face L3a of the multilayer body L3. The lead portion 32B is integrally formed with the first main portion 32A, and extends therefrom so as to reach the first side face L3a of the multilayer body L3. The lead portion 33B is integrally formed with the first main portion 33A, and extends therefrom so as to reach the first side face L3a of the multilayer body L3.

The first main portions 31A, 32A, 33A of the first inner conductors 31, 32, 33 are connected to the third outer conductor 3 through the lead portions 31B, 32B, 33B, respectively. As a consequence, the plurality of first inner conductors 31 to 33 are electrically connected to each other through the third outer conductor 3.

The second inner conductors 41 to 43 include their corresponding second main portions 41A to 43A and lead portions 41B to 43B. Each of the second main portions 41A to 43A has a substantially rectangular form. The plurality of second main portions 41A to 43A are formed at respective positions separated by a predetermined distance from a side face parallel to the inner opposing direction in the multilayer body L3.

The lead portions 41B to 43B are formed such as to be taken out to the second side face L3b of the multilayer body L3 from their corresponding second main portions 41A to 43A. The lead portion 41B is integrally formed with the second main portion 41A, and extends therefrom so as to reach the second side face L3b of the multilayer body L3. The lead portion 42B is integrally formed with the second main portion 42A, and extends therefrom so as to reach the second side face L3b of the multilayer body L3. The lead portion 43B is integrally formed with the second main portion 43A, and extends therefrom so as to reach the second side face L3b of the multilayer body L3.

The second main portions 41A, 42A, 43A of the second inner conductors 41, 42, 43 are connected to the second outer conductor 2 through the lead portions 41B, 42B, 43B, respectively. As a consequence, the plurality of second inner conductors 41 to 43 are electrically connected to each other through the second outer conductor 2.

A third inner conductor 51 and a fourth inner conductor 61 are laminated adjacent to each other with the dielectric layer 12 in between in the inner opposing direction in the multilayer body L3. The third inner conductor 51 and fourth inner conductor 61 have respective regions opposing each other with one dielectric layer 12 in between. The third inner conductor 51 and fourth inner conductor 61 are electrically insulated from each other.

The third inner conductor 51 includes a first conductor portion 51A having an oblong form, a second conductor portion 51B extending from the first conductor portion 51A so as to be taken out to the first side face L3a of the multilayer body L3, and a third conductor portion 51C extending from the first conductor portion 51A so as to be taken out to the first side face L3a of the multilayer body L3. The first conductor portion 51A is arranged such that its longitudinal direction is parallel to the first and second side faces L3a, L3b of the multilayer body L3.

The second conductor portion 51B of the third inner conductor 51 is connected to the first outer conductor 1. The third conductor portion 51C of the third inner conductor 51 is connected to the third outer conductor 3. As a consequence, the third inner conductor 51 is electrically connected to the first outer conductor 1 and third outer conductor 3.

The fourth inner conductor 61 includes a first conductor portion 61A having an oblong form, a second conductor portion 61B extending from the first conductor portion 61A so as to be taken out to the second side face L3b of the multilayer body L3, and a third conductor portion 61C extending from the first conductor portion 61A so as to be taken out to the second side face L3b of the multilayer body L3. The first conductor portion 61A is arranged such that its longitudinal direction is parallel to the first and second side faces L3a, L3b of the multilayer body L3.

The second conductor portion 61B of the fourth inner conductor 61 is connected to the second outer conductor 2. The third conductor portion 61C of the fourth inner conductor 61 is connected to the fourth outer conductor 4. As a consequence, the fourth inner conductor 61 is electrically connected to the second outer conductor 2 and fourth outer conductor 4.

The first conductor portion 51A of the third inner conductor 51 and the first conductor portion 61A of the fourth inner conductor 61 oppose each other with the dielectric layer 12 in between in the inner opposing direction in the multilayer body L3. Namely, the third inner conductor 51 and fourth inner conductor 61 have respective regions opposing each other with the dielectric layer 12 in between in the inner opposing direction in the multilayer body L3.

In the multilayer capacitor C3, the first inner conductors 31 to 33 are electrically connected to the first outer conductor 1 through the third outer conductor 3 and third inner conductor 51. The second inner conductors 41 to 43 are electrically connected to the fourth outer conductor 4 through the second outer conductor 2 and fourth inner conductor 61. As a consequence, either when the set of the first and second outer conductors 1, 2 or the set of the third and fourth outer conductors 3, 4 is connected to land patterns of a substrate or the like, the multilayer capacitor C3 can yield an equivalent series resistance greater than that of the conventional multilayer capacitor in which all the first and second inner conductors are connected to outer conductors connected to land patterns.

In particular, the multilayer capacitor C3 can set the number of outer conductors connected to no land patterns to 2, and thus can further increase the equivalent series resistance as compared with a capacitor in which the number of outer conductors connected to no land patterns is 3 or greater.

Since the equivalent series resistance is regulated by the third inner conductor 51 or fourth inner conductor 61, the multilayer capacitor C3 can increase its capacitance while raising equivalent series resistance by employing a greater number of laminated first and second inner conductors 31 to 33, 41 to 43 capable of forming a capacity component.

In the first and second inner conductors 31 to 33, 41 to 43 capable of forming the capacity component, only one species of inner conductors are connected to outer conductors connected to a land pattern of a substrate or the like no matter in which direction the multilayer capacitor C3 is mounted to the substrate or the like. Therefore, the multilayer capacitor C3 can increase its equivalent series resistance independently of the mounting direction, and thus can be mounted easily.

By connecting two outer conductors to land patterns, the multilayer capacitor C3 can yield a desirable effect (of increasing the equivalent series resistance and the like). Thus, it is sufficient for the multilayer capacitor C3 to connect two outer conductors to the substrate, whereby the circuit wiring on the mounting substrate can be simplified.

All the outer conductors (first to fourth outer conductors 1 to 4) in the multilayer capacitor C3 are formed on the first and second side faces L3a, L3b of the multilayer body L3 opposing each other. Therefore, as compared with the case where outer conductors are formed on three or more side faces (e.g., four side faces) of the multilayer body, the steps required for forming the outer conductors can be reduced. As a consequence, the multilayer capacitor C3 can be made easily.

In the multilayer capacitor, the first outer conductor 1 and third outer conductor 3 are formed on the first side face L3a of the multilayer body L3. On the other hand, the second outer conductor 2 and fourth outer conductor 4 are formed on the second side face L3b of the multilayer body L3, respectively. The first inner conductors 31 to 33 and the second inner conductors 41 to 43 are alternately laminated with a dielectric layer in between respectively. Consequently, in the multilayer capacitor C3, a magnetic field generated by a current flowing through the first inner conductors 31 to 33 and a magnetic field generated by a current flowing through the second inner conductors 41 to 43 cancel each other out. As a result, the multilayer capacitor C3 can reduce its equivalent series inductance. The effect of reducing the equivalent series inductance is exhibited remarkably in particular when a large number of first and second inner conductors are laminated.

The third and fourth inner conductors 51, 61 have respective regions opposing each other with the dielectric layer 12 in between in the inner opposing direction in the multilayer body L3, and thus can contribute to forming a capacity component. Therefore, the multilayer capacitor C3 can further increase its capacitance.

Fourth Embodiment

Figure 14:
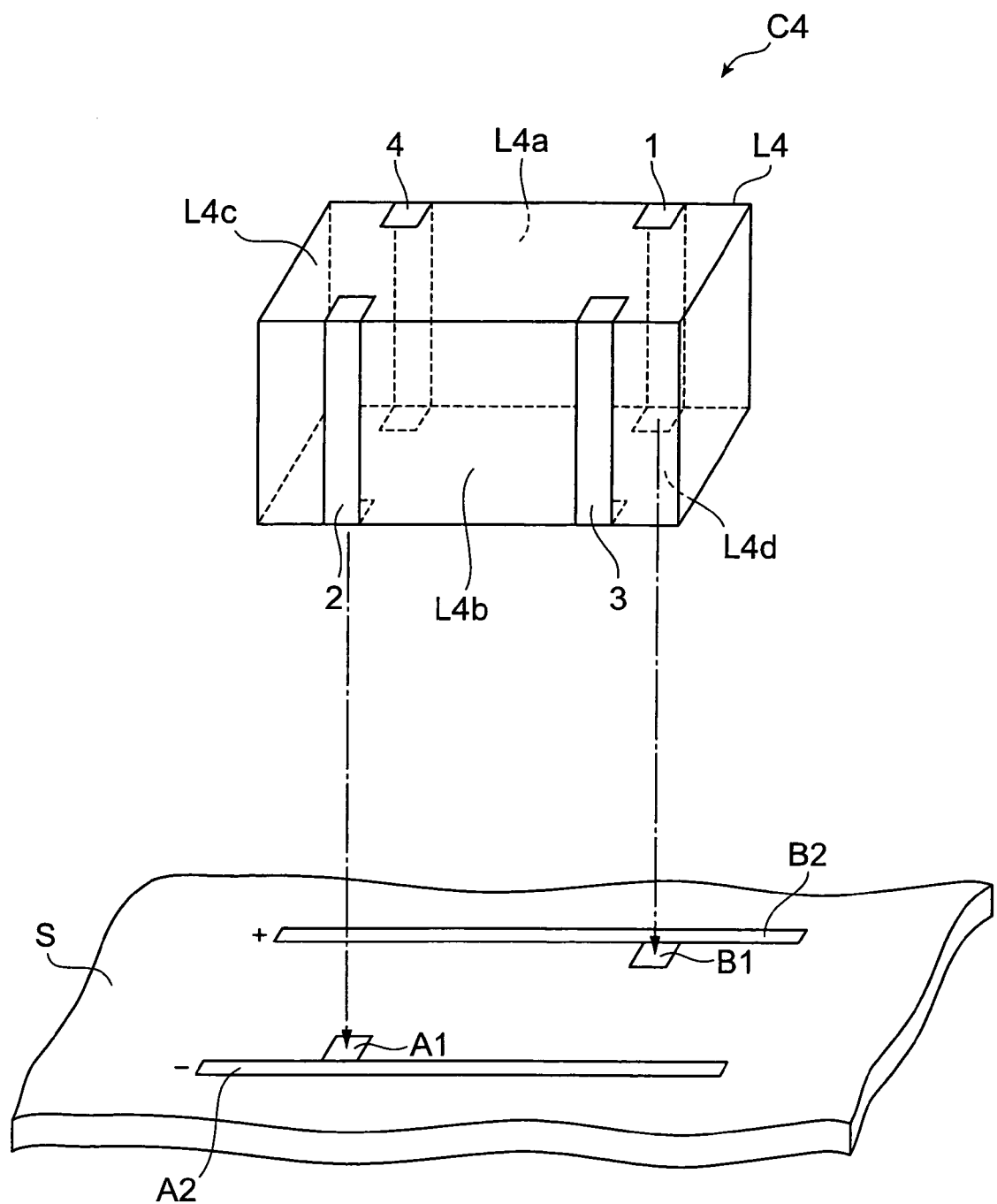
FIG. 14 is a perspective view of the multilayer capacitor in accordance with a fourth embodiment.
Figure 15:
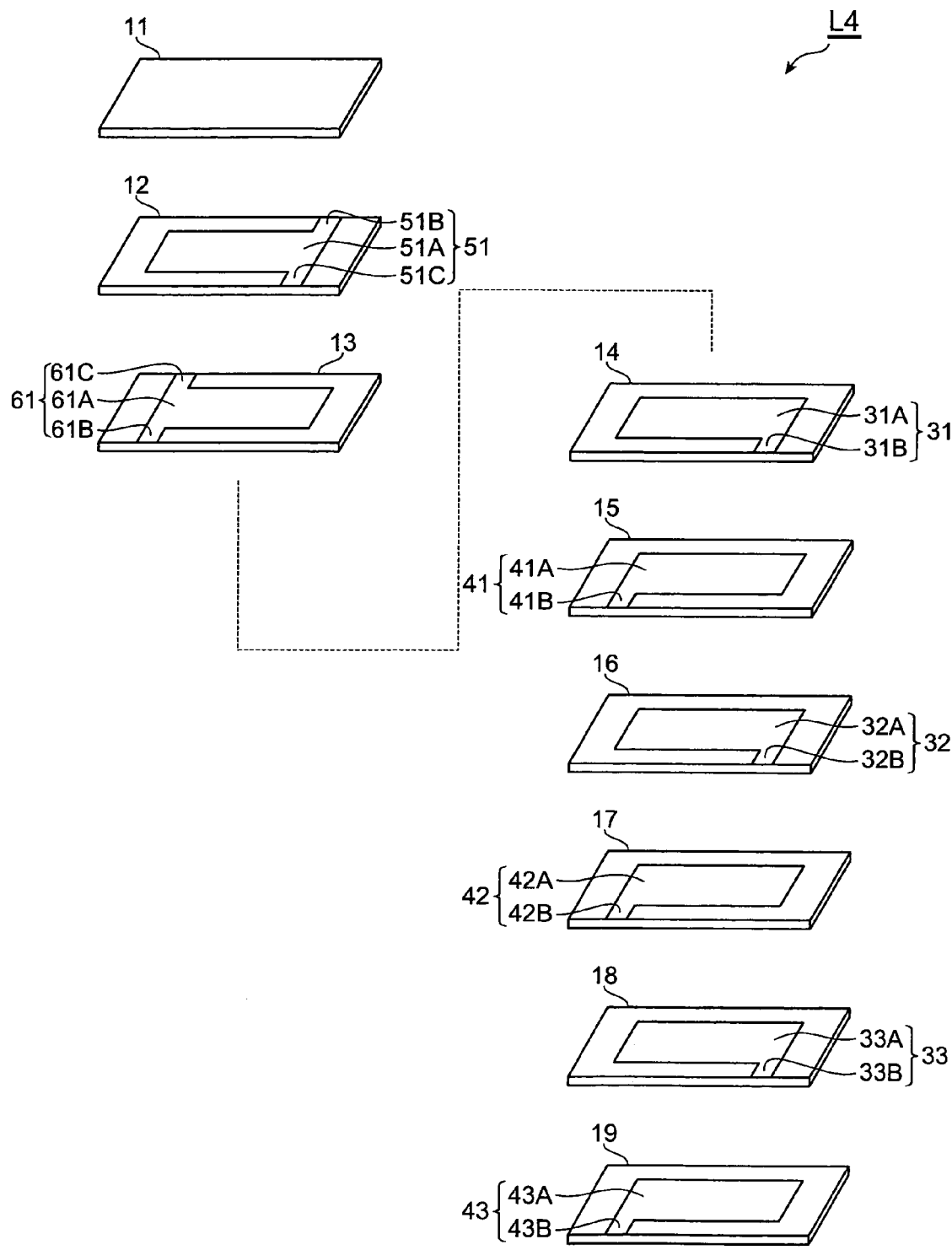
FIG. 15 is an exploded perspective view of the multilayer body included in the multilayer capacitor in accordance with the fourth embodiment.

With reference to FIGS. 14 and 15, the structure of the multilayer capacitor in accordance with a fourth embodiment will be explained. The multilayer capacitor in accordance with the fourth embodiment differs from the multilayer capacitor C1 in accordance with the first embodiment in terms of the arrangement of outer conductors in the multilayer body. FIG. 14 is a perspective view of the multilayer capacitor in accordance with the fourth embodiment. FIG. 15 is an exploded perspective view of the multilayer body included in the multilayer capacitor in accordance with the fourth embodiment.

As shown in FIG. 14, the multilayer capacitor C4 in accordance with the fourth embodiment comprises a multilayer body L4 having a substantially rectangular parallelepiped form, and four outer conductors formed on side faces of the multilayer body L4. The four outer conductors are a first outer conductor 1, a second outer conductor 2, a third outer conductor 3, and a fourth outer conductor 4. The four outer conductors are formed so as to be electrically insulated from each other on the surface of the multilayer body L4.

Both of the first outer conductor 1 and fourth outer conductor 4 are positioned on a first side face L4a in side faces parallel to an inner opposing direction of the multilayer body L4 which will be explained later, i.e., the first side face L4a that is a side face extending along the longitudinal direction of side faces L4c, L4d orthogonal to the inner opposing direction of the multilayer body L4. The first outer conductor 1 and fourth outer conductor 4 are formed such that the fourth outer conductor 4 and first outer conductor 1 are arranged successively from the left side to right side of FIG. 14.

Both of the second outer conductor 2 and third outer conductor 3 are positioned on a second side face L4b in side faces parallel to the inner opposing direction of the multilayer body L4 to be explained later, i.e., the second side face L4b that is a side face extending along the longitudinal direction of side faces L4c, L4d orthogonal to the inner opposing direction while opposing the first side face L4a. The second outer conductor 2 and third outer conductor 3 are formed such that the second outer conductor 2 and third outer conductor 3 are arranged successively from the left side to right side of FIG. 14.

Thus, two outer conductors (the first outer conductor 1 and fourth outer conductor 4) among the four outer conductors (the first to fourth outer conductors 1 to 4) are positioned on the first side face L4a of the multilayer body L4, whereas the remaining two outer conductors (the second outer conductor 2 and third outer conductor 3) are positioned on the second side face L4b opposing the first side face L4a.

The two outer conductors (first and fourth outer conductors 1, 4) formed on the first side face L4a of the multilayer body L4 and the remaining two outer conductors (second and third outer conductors 2, 3) formed on the second side face L4b are located at respective positions opposing each other in a direction along which the first side face L4a and second side face L4b oppose each other. Namely, the third outer conductor 3 is located at a position opposing the first outer conductor 1 in the opposing direction of the first side face L4a and second side face L4b in the multilayer body L4. The fourth outer conductor 4 is located at a position opposing the second outer conductor 2 in the opposing direction of the first side face L4a and second side face L4b in the multilayer body L4.

As shown in FIG. 15, the multilayer body L4 is formed by laminating a plurality of (9 in this embodiment) dielectric layers 11 to 19. In the multilayer body L4, a plurality of (3 each in this embodiment) first and second inner conductors 31 to 33, 41 to 43 are included such as have respective regions opposing each other with at least one of dielectric layers 14 to 18 in between.

The first inner conductors 31 to 33 include their corresponding first main portions 31A to 33A and lead portions 31B to 33B. Each of the first main portions 31A to 33A has a substantially rectangular form. The plurality of first main portions 31A to 33A are formed at respective positions separated by a predetermined distance from a side face parallel to a direction along which the respective first inner conductors 31 to 33 and the respective second inner conductors 41 to 43 oppose each other (hereinafter simply referred to as "inner opposing direction") in the multilayer body L4.

The lead portions 31B to 33B are formed such as to be taken out to the first side face L4a of the multilayer body L4 from their corresponding first main portions 31A to 33A. The lead portion 31B is integrally formed with the first main portion 31A, and extends therefrom so as to reach the second side face L4b of the multilayer body L4. The lead portion 32B is integrally formed with the first main portion 32A, and extends therefrom so as to reach the second side face L4b of the multilayer body L4. The lead portion 33B is integrally formed with the first main portion 33A, and extends therefrom so as to reach the second side face L4b of the multilayer body L4.

The first main portions 31A, 32A, 33A of the first inner conductors 31, 32, 33 are connected to the third outer conductor 3 through the lead portions 31B, 32B, 33B, respectively. As a consequence, the plurality of first inner conductors 31 to 33 are electrically connected to each other through the third outer conductor 3.

The second inner conductors 41 to 43 include their corresponding second main portions 41A to 43A and lead portions 41B to 43B. Each of the second main portions 41A to 43A has a substantially rectangular form. The plurality of second main portions 41A to 43A are formed at respective positions separated by a predetermined distance from a side face parallel to the inner opposing direction in the multilayer body L4.

The lead portions 41B to 43B are formed such as to be taken out to the second side face L4b of the multilayer body L4 from their corresponding second main portions 41A to 43A. The lead portion 41B is integrally formed with the second main portion 41A, and extends therefrom so as to reach the second side face L4b of the multilayer body L4. The lead portion 42B is integrally formed with the second main portion 42A, and extends therefrom so as to reach the second side face L4b of the multilayer body L4. The lead portion 43B is integrally formed with the second main portion 43A, and extends therefrom so as to reach the second side face L4b of the multilayer body L4.

The second main portions 41A, 42A, 43A of the second inner conductors 41, 42, 43 are connected to the second outer conductor 2 through the lead portions 41B, 42B, 43B, respectively. As a consequence, the plurality of second inner conductors 41 to 43 are electrically connected to each other through the second outer conductor 2.

A third inner conductor 51 and a fourth inner conductor 61 are laminated adjacent to each other with the dielectric layer 12 in between in the inner opposing direction in the multilayer body L4. The third inner conductor 51 and fourth inner conductor 61 have respective regions opposing each other with one dielectric layer 12 in between. The third inner conductor 51 and fourth inner conductor 61 are electrically insulated from each other.

The third inner conductor 51 includes a first conductor portion 51A having an oblong form, a second conductor portion 51B extending from the first conductor portion 51A so as to be taken out to the first side face L4a of the multilayer body L4, and a third conductor portion 51C extending from the first conductor portion 51A so as to be taken out to the second side face L4b of the multilayer body L4. The first conductor portion 51A is arranged such that its longitudinal direction is parallel to the first and second side faces L4a, L4b of the multilayer body L4.

The second conductor portion 51B of the third inner conductor 51 is connected to the first outer conductor 1. The third conductor portion 51C of the third inner conductor 51 is connected to the third outer conductor 3. As a consequence, the third inner conductor 51 is electrically connected to the first outer conductor 1 and third outer conductor 3.

The fourth inner conductor 61 includes a first conductor portion 61A having an oblong form, a second conductor portion 61B extending from the first conductor portion 61A so as to be taken out to the second side face L4b of the multilayer body L4, and a third conductor portion 61C extending from the first conductor portion 61A so as to be taken out to the second side face L4b of the multilayer body L4. The first conductor portion 61A is arranged such that its longitudinal direction is parallel to the first and second side faces L4a, L4b of the multilayer body L4.

The second conductor portion 61B of the fourth inner conductor 61 is connected to the second outer conductor 2. The third conductor portion 61C of the fourth inner conductor 61 is connected to the fourth outer conductor 4. As a consequence, the fourth inner conductor 61 is electrically connected to the second outer conductor 2 and fourth outer conductor 4.

The first conductor portion 51A of the third inner conductor 51 and the first conductor portion 61A of the fourth inner conductor 61 oppose each other with the dielectric layer 12 in between in the opposing direction in the multilayer body L4. Namely, the third inner conductor 51 and fourth inner conductor 61 have respective regions opposing each other with the dielectric layer 12 in between in the opposing direction in the multilayer body L4.

In the multilayer capacitor C4, the first inner conductors 31 to 33 are electrically connected to the first outer conductor 1 through the third outer conductor 3 and third inner conductor 51. The second inner conductors 41 to 43 are electrically connected to the fourth outer conductor 4 through the second outer conductor 2 and fourth inner conductor 61. As a consequence, either when the set of the first and second outer conductors 1, 2 or the set of the third and fourth outer conductors 3, 4 is connected to land patterns of a substrate or the like, the multilayer capacitor C4 can yield an equivalent series resistance greater than that of the conventional multilayer capacitor in which all the first and second inner conductors are connected to outer conductors connected to land patterns.

In particular, the multilayer capacitor C4 can set the number of outer conductors connected to no land patterns to 2, and thus can further increase the equivalent series resistance as compared with a capacitor in which the number of outer conductors connected to no land patterns is 3 or greater.

Since the equivalent series resistance is regulated by the third inner conductor 51 or fourth inner conductor 61, the multilayer capacitor C4 can increase its capacitance while raising equivalent series resistance by employing a greater number of laminated first and second inner conductors 31 to 33, 41 to 43 capable of forming a capacity component.

In the first and second inner conductors 31 to 33, 41 to 43 capable of forming the capacity component, only one species of inner conductors are connected to outer conductors connected to a land pattern of a substrate or the like no matter in which direction the multilayer capacitor C4 is mounted to the substrate or the like. Therefore, the multilayer capacitor C4 can increase its equivalent series resistance independently of the mounting direction, and thus can be mounted easily.

By connecting two outer conductors to land patterns, the multilayer capacitor C4 can yield a desirable effect (of increasing the equivalent series resistance and the like). Thus, it is sufficient for the multilayer capacitor C4 to connect two outer conductors to the substrate, whereby the circuit wiring on the mounting substrate can be simplified.

All the outer conductors (first to fourth outer conductors 1 to 4) in the multilayer capacitor C4 are formed on the first and second side faces L4a, L4b of the multilayer body L4 opposing each other. Therefore, as compared with the case where outer conductors are formed on three or more side faces (e.g., four side faces) of the multilayer body, the steps required for forming the outer conductors can be reduced. As a consequence, the multilayer capacitor C4 can be made easily.

The third and fourth inner conductors 51, 61 have respective regions opposing each other with the dielectric layer 12 in between in the inner opposing direction in the multilayer body L4, and thus can contribute to forming a capacity component. Therefore, the multilayer capacitor C4 can further increase its capacitance.

Fifth Embodiment

Figure 16:
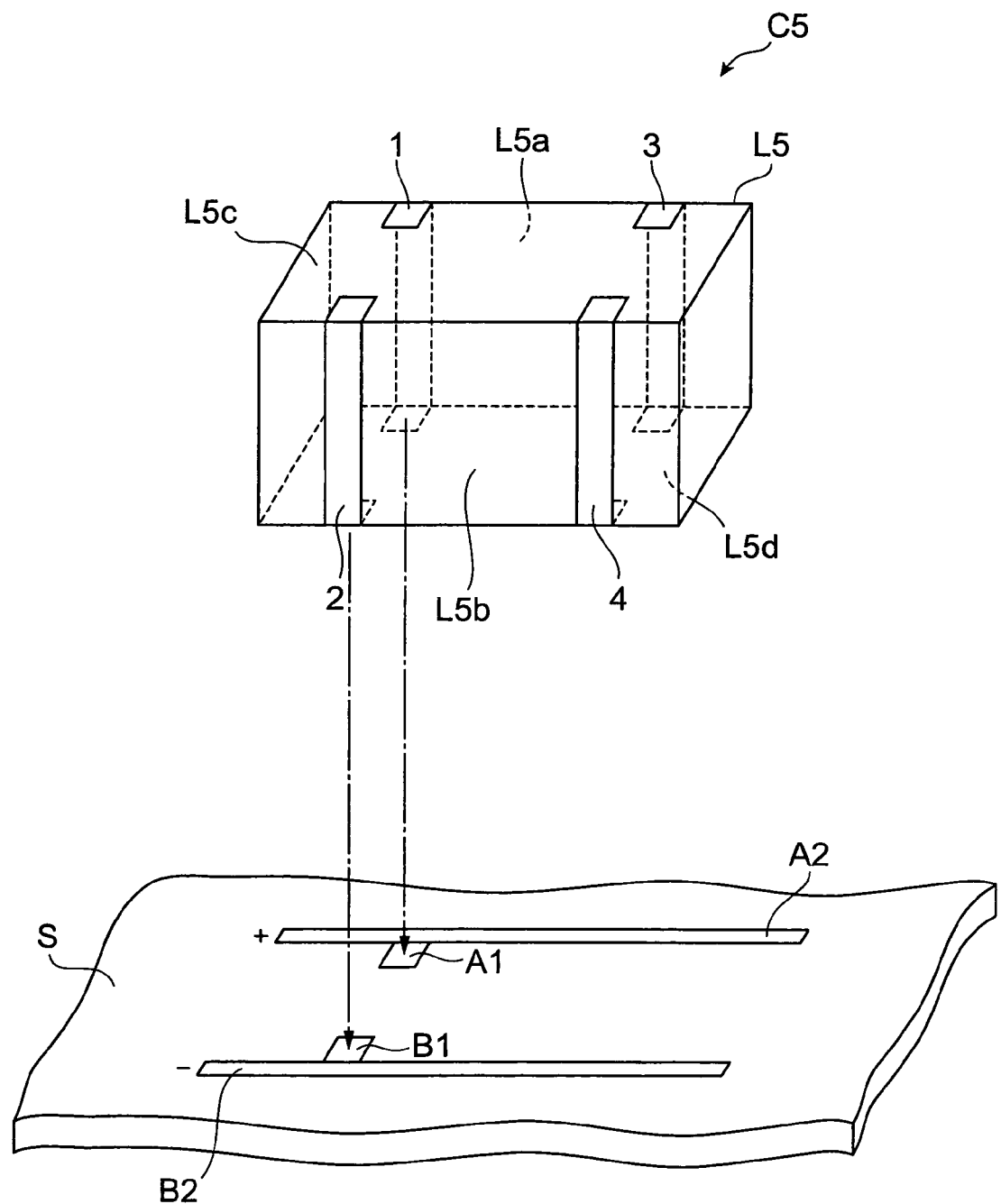
FIG. 16 is a perspective view of the multilayer capacitor in accordance with a fifth embodiment.
Figure 17:
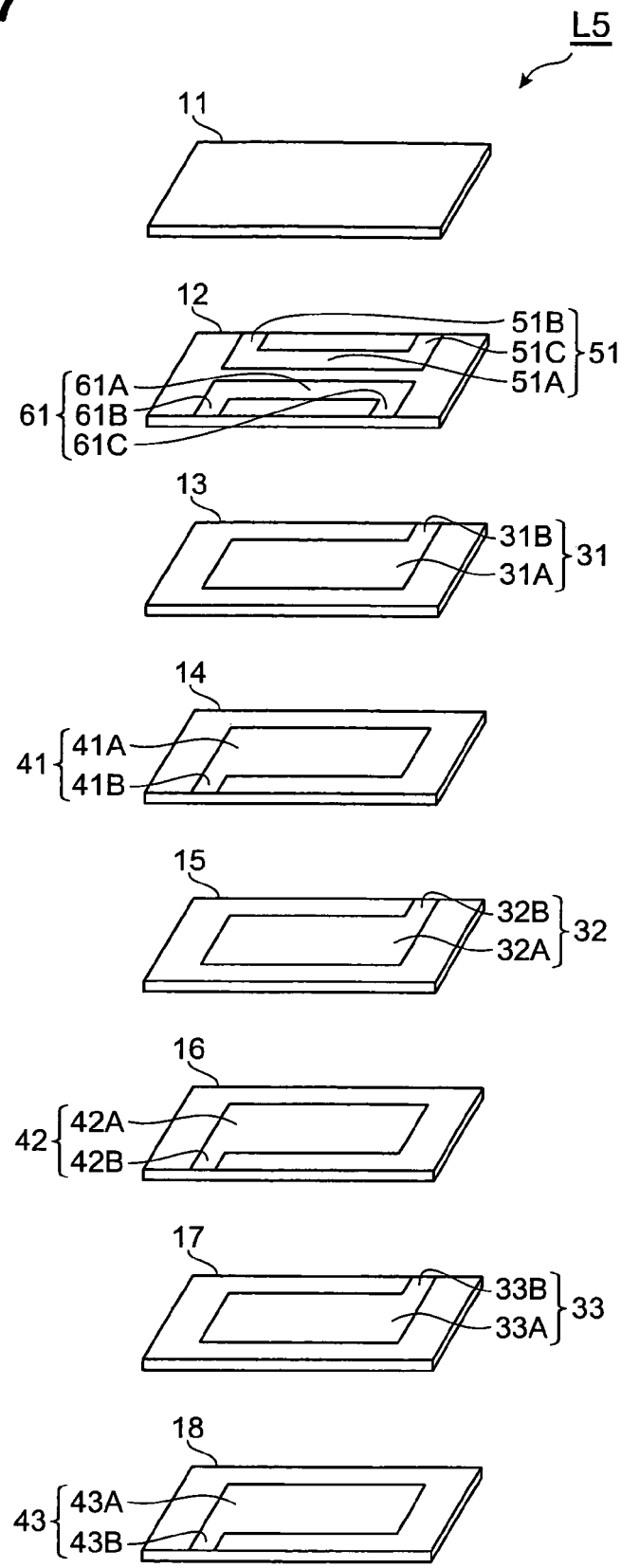
FIG. 17 is an exploded perspective view of the multilayer body included in the multilayer capacitor in accordance with the fifth embodiment.

With reference to FIGS. 16 and 17, the structure of the multilayer capacitor in accordance with a fifth embodiment will be explained. The multilayer capacitor in accordance with the fifth embodiment differs from the multilayer capacitor C1 in accordance with the first embodiment in terms of the arrangement of inner conductors in the multilayer body. FIG. 16 is a perspective view of the multilayer capacitor in accordance with the fifth embodiment. FIG. 17 is an exploded perspective view of the multilayer body included in the multilayer capacitor in accordance with the fifth embodiment.

As shown in FIG. 16, the multilayer capacitor C5 in accordance with the fifth embodiment comprises a multilayer body L5 having a substantially rectangular parallelepiped form, and four outer conductors formed on side faces of the multilayer body L5. The four outer conductors are a first outer conductor 1, a second outer conductor 2, a third outer conductor 3, and a fourth outer conductor 4. The four outer conductors are formed so as to be electrically insulated from each other on the surface of the multilayer body L5.

Both of the first outer conductor 1 and third outer conductor 3 are positioned on a first side face L5a in side faces parallel to an inner opposing direction of the multilayer body L5 which will be explained later, i.e., the first side face L5a that is a side face extending along the longitudinal direction of side faces L5c, L5d orthogonal to the inner opposing direction of the multilayer body L5. The first outer conductor 1 and third outer conductor 3 are formed such that first outer conductor 1 and third outer conductor 3 are arranged successively from the left side to right side of FIG. 16.

Both of the second outer conductor 2 and fourth outer conductor 4 are positioned on a second side face L5b in side faces parallel to the inner opposing direction of the multilayer body L5 to be explained later, i.e., the second side face L5b that is a side face extending along the longitudinal direction of side faces L5c, L5d orthogonal to the inner opposing direction while opposing the first side face L5a. The second outer conductor 2 and fourth outer conductor 4 are formed such that the second outer conductor 2 and fourth outer conductor 4 are arranged successively from the left side to right side of FIG. 16.

Thus, two outer conductors (the first outer conductor 1 and third outer conductor 3) among the four outer conductors (the first to fourth outer conductors 1 to 4) are positioned on the first side face L5a of the multilayer body L5, whereas the remaining two outer conductors (the second outer conductor 2 and fourth outer conductor 4) are positioned on the second side face L5b opposing the first side face L5a.

The two outer conductors (first and third outer conductors 1, 3) formed on the first side face L5a of the multilayer body L5 and the remaining two outer conductors (second and fourth outer conductors 2, 4) formed on the second side face L5b are located at respective positions opposing each other in a direction along which the first side face L5a and second side face L5b oppose each other. Namely, the second outer conductor 2 is located at a position opposing the first outer conductor 1 in the opposing direction of the first side face L5a and second side face L5b in the multilayer body L5. The fourth outer conductor 4 is located at a position opposing the third outer conductor 3 in the opposing direction of the first side face L5a and second face L5b in the multilayer body L5.

As shown in FIG. 17, the multilayer body L5 is formed by laminating a plurality of (8 in this embodiment) dielectric layers 11 to 18. In the multilayer body L5, a plurality of (3 each in this embodiment) first and second inner conductors 31 to 33, 41 to 43 are included such as have respective regions opposing each other with at least one of dielectric layers 13 to 17 in between.

The first inner conductors 31 to 33 include their corresponding first main portions 31A to 33A and lead portions 31B to 33B. Each of the first main portions 31A to 33A has a substantially rectangular form. The plurality of first main portions 31A to 33A are formed at respective positions separated by a predetermined distance from a side face parallel to a direction along which the respective first inner conductors 31 to 33 and the respective second inner conductors 41 to 43 oppose each other (hereinafter simply referred to as "inner opposing direction") in the multilayer body L5.

The lead portions 31B to 33B are formed such as to be taken out to the first side face L5a of the multilayer body L5 from their corresponding first main portions 31A to 33A. The lead portion 31B is integrally formed with the first main portion 31A, and extends therefrom so as to reach the first side face L5a of the multilayer body L5. The lead portion 32B is integrally formed with the first main portion 32A, and extends therefrom so as to reach the first side face L5a of the multilayer body L5. The lead portion 33B is integrally formed with the first main portion 33A, and extends therefrom so as to reach the first side face L5a of the multilayer body L5.

The first main portions 31A, 32A, 33A of the first inner conductors 31, 32, 33 are connected to the third outer conductor 3 through the lead portions 31B, 32B, 33B, respectively. As a consequence, the plurality of first inner conductors 31 to 33 are electrically connected to each other through the third outer conductor 3.

The second inner conductors 41 to 43 include their corresponding second main portions 41A to 43A and lead portions 41B to 43B. Each of the second main portions 41A to 43A has a substantially rectangular form. The plurality of second main portions 41A to 43A are formed at respective positions separated by a predetermined distance from a side face parallel to the inner opposing direction in the multilayer body L5.

The lead portions 41B to 43B are formed such as to be taken out to the second side face L5b of the multilayer body L5 from their corresponding second main portions 41A to 43A. The lead portion 41B is integrally formed with the second main portion 41A, and extends therefrom so as to reach the second side face L5b of the multilayer body L5. The lead portion 42B is integrally formed with the second main portion 42A, and extends therefrom so as to reach the second side face L5b of the multilayer body L5. The lead portion 43B is integrally formed with the second main portion 43A, and extends therefrom so as to reach the second side face L5b of the multilayer body L5.

The second main portions 41A, 42A, 43A of the second inner conductors 41, 42, 43 are connected to the second outer conductor 2 through the lead portions 41B, 42B, 43B, respectively. As a consequence, the plurality of second inner conductors 41 to 43 are electrically connected to each other through the second outer conductor 2.

A third inner conductor 51 and a fourth inner conductor 61 are arranged at the same position in a direction along which the first inner conductor 31 and second inner conductor 41 oppose each other, i.e., in the inner opposing direction. Namely, the third inner conductor 51 and fourth inner conductor 61 are laminated so as to be positioned between the same two dielectric layers 11, 13 among the plurality of dielectric layers 11 to 18 in the multilayer body L5. The third inner conductor 51 and fourth inner conductor 61 are electrically insulated from each other.

The third inner conductor 51 includes a first conductor portion 51A having an oblong form, a second conductor portion 51B extending from the first conductor portion 51A so as to be taken out to the first side face L5a of the multilayer body L5, and a third conductor portion 51C extending from the first conductor portion 51A so as to be taken out to the first side face L5a of the multilayer body L5. The first conductor portion 51A is arranged such that its longitudinal direction is parallel to the first and second side faces L5a, L5b of the multilayer body L5.

The second conductor portion 51B of the third inner conductor 51 is connected to the first outer conductor 1. The third conductor portion 51C of the third inner conductor 51 is connected to the third outer conductor 3. As a consequence, the third inner conductor 51 is electrically connected to the first outer conductor 1 and third outer conductor 3.

The fourth inner conductor 61 includes a first conductor portion 61A having an oblong form, a second conductor portion 61B extending from the first conductor portion 61A so as to be taken out to the second side face L5b of the multilayer body L5, and a third conductor portion 61C extending from the first conductor portion 61A so as to be taken out to the second side face L5b of the multilayer body L5. The first conductor portion 61A is arranged such that its longitudinal direction is parallel to the first and second side faces L5a, L5b of the multilayer body L5.

The second conductor portion 61B of the fourth inner conductor 61 is connected to the second outer conductor 2. The third conductor portion 61C of the fourth inner conductor 61 is connected to the fourth outer conductor 4. As a consequence, the fourth inner conductor 61 is electrically connected to the second outer conductor 2 and fourth outer conductor 4.

The first conductor portion 51A of the third inner conductor 51 and the first conductor portion 61A of the fourth inner conductor 61 are adjacent to each other in the opposing direction of the first side face 5a and second side face 5b in the multilayer body L5. Namely, the third inner conductor 51 and fourth inner conductor 61 have respective regions which are adjacent to each other in the opposing direction of the first side face 5a and second side face 5b in the multilayer body L5.

In the multilayer capacitor C5, the first inner conductors 31 to 33 are electrically connected to the first outer conductor 1 through the third outer conductor 3 and third inner conductor 51. The second inner conductors 41 to 43 are electrically connected to the fourth outer conductor 4 through the second outer conductor 2 and fourth inner conductor 61. As a consequence, either when the set of the first and second outer conductors 1, 2 or the set of the third and fourth outer conductors 3, 4 is connected to land patterns of a substrate or the like, the multilayer capacitor C5 can yield an equivalent series resistance greater than that of the conventional multilayer capacitor in which all the first and second inner conductors are connected to outer conductors connected to land patterns.

In particular, the multilayer capacitor C5 can set the number of outer conductors connected to no land patterns to 2, and thus can further increase the equivalent series resistance as compared with a capacitor in which the number of outer conductors connected to no land patterns is 3 or greater.

Since the equivalent series resistance is regulated by the third inner conductor 51 or fourth inner conductor 61, the multilayer capacitor C5 can increase its capacitance while raising equivalent series resistance by employing a greater number of laminated first and second inner conductors 31 to 33, 41 to 43 capable of forming a capacity component.

In the first and second inner conductors 31 to 33, 41 to 43 capable of forming the capacity component, only one species of inner conductors are connected to outer conductors connected to a land pattern of a substrate or the like no matter in which direction the multilayer capacitor C5 is mounted to the substrate or the like. Therefore, the multilayer capacitor C5 can increase its equivalent series resistance independently of the mounting direction, and thus can be mounted easily.

By connecting two outer conductors to land patterns, the multilayer capacitor C5 can yield a desirable effect (of increasing the equivalent series resistance and the like). Thus, it is sufficient for the multilayer capacitor C5 to connect two outer conductors to the substrate, whereby the circuit wiring on the mounting substrate can be simplified.

All the outer conductors (first to fourth outer conductors 1 to 4) in the multilayer capacitor C5 are formed on the first and second side faces L5a, L5b of the multilayer body L5 opposing each other. Therefore, as compared with the case where outer conductors are formed on three or more side faces (e.g., four side faces) of the multilayer body, the steps required for forming the outer conductors can be reduced. As a consequence, the multilayer capacitor C5 can be made easily.

In the multilayer capacitor, the first outer conductor 1 and third outer conductor 3 are formed on the first side face L5a of the multilayer body L5. On the other hand, the second outer conductor 2 and fourth outer conductor 4 are formed on the second side face L5b of the multilayer body L5. The first conductor portion 51A of the third inner conductor 51 and the first conductor portion 61A of the fourth inner conductor 61 are adjacent to each other in the opposing direction of the first side face L5a and second side face L5b in the multilayer body L5. Consequently, in the multilayer capacitor C5, a magnetic field generated by a current flowing through the third inner conductor 51 and a magnetic field generated by a current flowing through the fourth inner conductor 61 cancel each other out. As a result, the multilayer capacitor C5 can reduce its equivalent series inductance.

Sixth Embodiment

Figure 18:
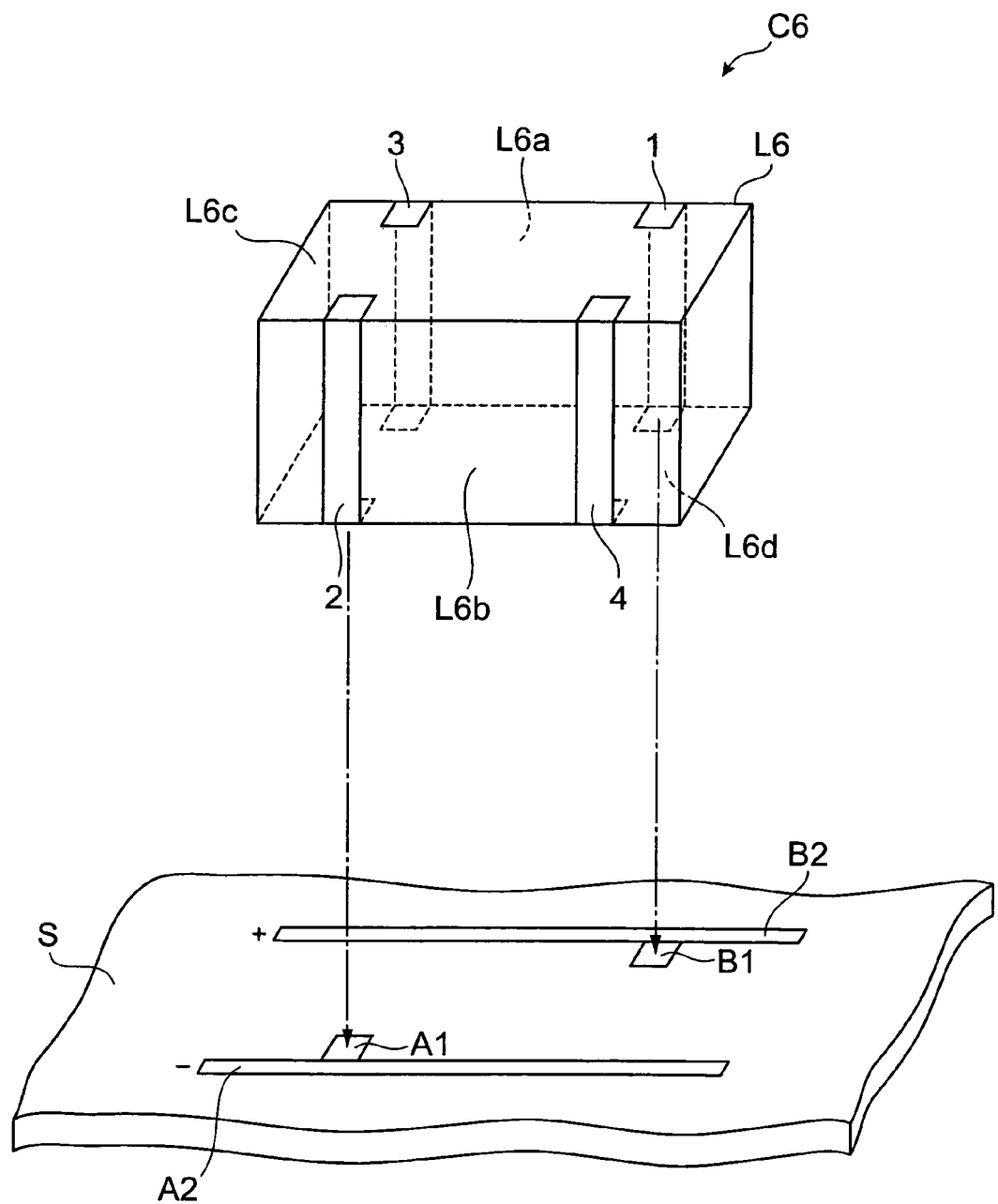
FIG. 18 is a perspective view of the multilayer capacitor in accordance with a sixth embodiment.
Figure 19:
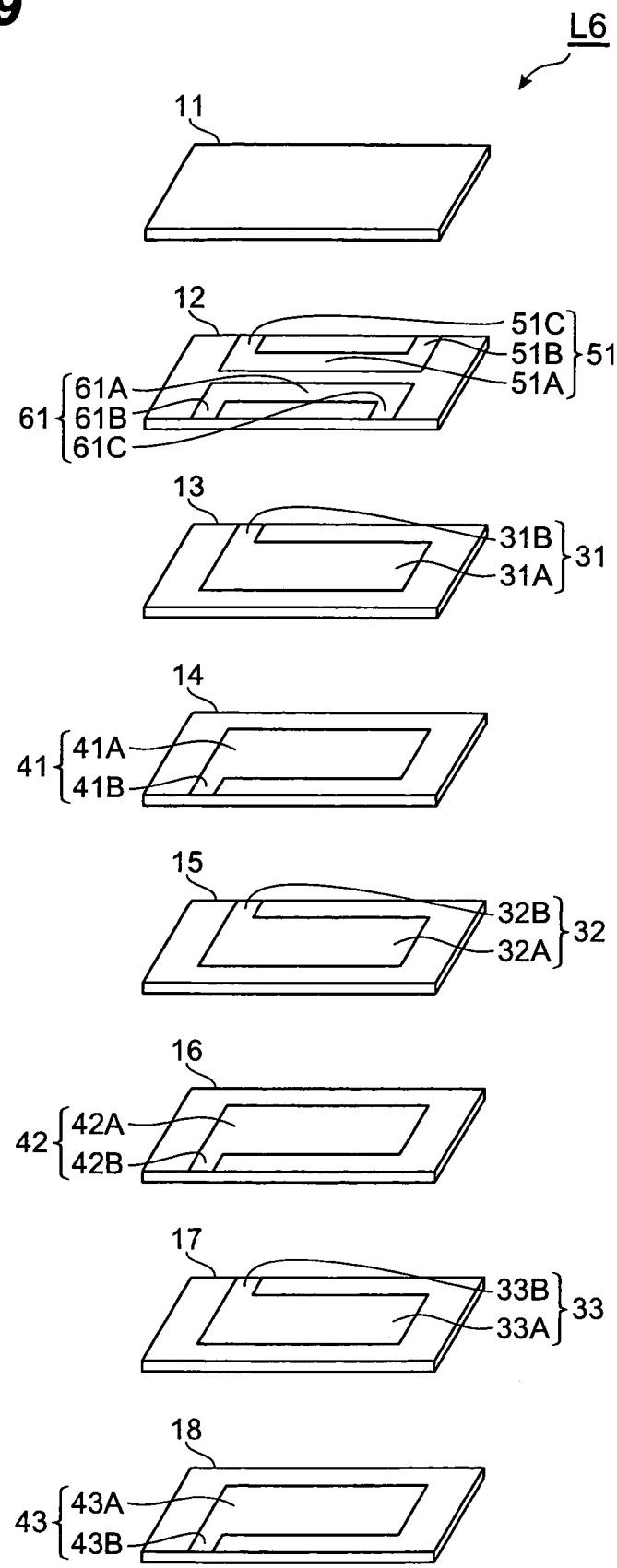
FIG. 19 is an exploded perspective view of the multilayer body included in the multilayer capacitor in accordance with the sixth embodiment.

With reference to FIGS. 18 and 19, the structure of the multilayer capacitor in accordance with a sixth embodiment will be explained. The multilayer capacitor in accordance with the sixth embodiment differs from the multilayer capacitor C5 in accordance with the fifth embodiment in terms of the arrangement of outer conductors. FIG. 18 is a perspective view of the multilayer capacitor in accordance with the sixth embodiment. FIG. 19 is an exploded perspective view of the multilayer body included in the multilayer capacitor in accordance with the sixth embodiment.

As shown in FIG. 18, the multilayer capacitor C6 in accordance with the sixth embodiment comprises a multilayer body L6 having a substantially rectangular parallelepiped form, and four outer conductors formed on side faces of the multilayer body L6. The four outer conductors are a first outer conductor 1, a second outer conductor 2, a third outer conductor 3, and a fourth outer conductor 4. The four outer conductors are formed so as to be electrically insulated from each other on the surface of the multilayer body L6.

Both of the first outer conductor 1 and third outer conductor 3 are positioned on a first side face L6a in side faces parallel to an inner opposing direction of the multilayer body L6 which will be explained later, i.e., the first side face L6a that is a side face extending along the longitudinal direction of side faces L6c, L6d orthogonal to the inner opposing direction of the multilayer body L6. The first outer conductor 1 and third outer conductor 3 are formed such that the third outer conductor 3 and first outer conductor 1 are arranged successively from the left side to right side of FIG. 18.

Both of the second outer conductor 2 and fourth outer conductor 4 are positioned on a second side face L6b in side faces parallel to the inner opposing direction of the multilayer body L6 to be explained later, i.e., the second side face L6b that is a side face extending along the longitudinal direction of side faces L6c, L6d orthogonal to the inner opposing direction while opposing the first side face L6a. The second outer conductor 2 and fourth outer conductor 4 are formed such that the second outer conductor 2 and fourth outer conductor 4 are arranged successively from the left side to right side of FIG. 18.

Thus, two outer conductors (the first outer conductor 1 and third outer conductor 3) among the four outer conductors (the first to fourth outer conductors 1 to 4) are positioned on the first side face L6a of the multilayer body L6, whereas the remaining two outer conductors (the second outer conductor 2 and fourth outer conductor 4) are positioned on the second side face L6b opposing the first side face L6a.

The two outer conductors (first and third outer conductors 1, 3) formed on the first side face L6a of the multilayer body L6 and the remaining two outer conductors (second and fourth outer conductors 2, 4) formed on the second side face L6b are located at respective positions opposing each other in a direction along which the first side face L6a and second side face L6b oppose each other. Namely, the fourth outer conductor 4 is located at a position opposing the first outer conductor 1 in the opposing direction of the first side face L6a and second side face L6b in the multilayer body L6. The third outer conductor 3 is located at a position opposing the second outer conductor 2 in the opposing direction of the first side face L6a and second side face L6b in the multilayer body L6.

As shown in FIG. 19, the multilayer body L6 is formed by laminating a plurality of (8 in this embodiment) dielectric layers 11 to 18. In the multilayer body L6, a plurality of (3 each in this embodiment) first and second inner conductors 31 to 33, 41 to 43 are included such as have respective regions opposing each other with at least one of dielectric layers 13 to 17 in between.

The first inner conductors 31 to 33 include their corresponding first main portions 31A to 33A and lead portions 31B to 33B. Each of the first main portions 31A to 33A has a substantially rectangular form. The plurality of first main portions 31A to 33A are formed at respective positions separated by a predetermined distance from a side face parallel to a direction along which the respective first inner conductors 31 to 33 and the respective second inner conductors 41 to 43 oppose each other (hereinafter simply referred to as "inner opposing direction") in the multilayer body L6.

The lead portions 31B to 33B are formed such as to be taken out to the first side face L6a of the multilayer body L6 from their corresponding first main portions 31A to 33A. The lead portion 31B is integrally formed with the first main portion 31A, and extends therefrom so as to reach the first side face L6a of the multilayer body L6. The lead portion 32B is integrally formed with the first main portion 32A, and extends therefrom so as to reach the first side face L6a of the multilayer body L6. The lead portion 33B is integrally formed with the first main portion 33A, and extends therefrom so as to reach the first side face L6a of the multilayer body L6.

The first main portions 31A, 32A, 33A of the first inner conductors 31, 32, 33 are connected to the third outer conductor 3 through the lead portions 31B, 32B, 33B, respectively. As a consequence, the plurality of first inner conductors 31 to 33 are electrically connected to each other through the third outer conductor 3.

The second inner conductors 41 to 43 include their corresponding second main portions 41A to 43A and lead portions 41B to 43B. Each of the second main portions 41A to 43A has a substantially rectangular form. The plurality of second main portions 41A to 43A are formed at respective positions separated by a predetermined distance from a side face parallel to the inner opposing direction in the multilayer body L6.

The lead portions 41B to 43B are formed such as to be taken out to the second side face L6b of the multilayer body L6 from their corresponding second main portions 41A to 43A. The lead portion 41B is integrally formed with the second main portion 41A, and extends therefrom so as to reach the second side face L6b of the multilayer body L6. The lead portion 42B is integrally formed with the second main portion 42A, and extends therefrom so as to reach the second side face L6b of the multilayer body L6. The lead portion 43B is integrally formed with the second main portion 43A, and extends therefrom so as to reach the second side face L6b of the multilayer body L6.

The second main portions 41A, 42A, 43A of the second inner conductors 41, 42, 43 are connected to the second outer conductor 2 through the lead portions 41B, 42B, 43B, respectively. As a consequence, the plurality of second inner conductors 41 to 43 are electrically connected to each other through the second outer conductor 2.

A third inner conductor 51 and a fourth inner conductor 61 are arranged at the same position in a direction along which the first inner conductor 31 and second inner conductor 41 oppose each other, i.e., in the inner opposing direction. Namely, the third inner conductor 51 and fourth inner conductor 61 are laminated so as to be positioned between the same two dielectric layers 11, 12 among the plurality of dielectric layers 11 to 18. The third inner conductor 51 and fourth inner conductor 61 are electrically insulated from each other.

The third inner conductor 51 includes a first conductor portion 51A having an oblong form, a second conductor portion 51B extending from the first conductor portion 51A so as to be taken out to the first side face L6a of the multilayer body L6, and a third conductor portion 51C extending from the first conductor portion 51A so as to be taken out to the first side face L6a of the multilayer body L6. The first conductor portion 51A is arranged such that its longitudinal direction is parallel to the first and second side faces L6a, L6b of the multilayer body L6.

The second conductor portion 51B of the third inner conductor 51 is connected to the first outer conductor 1. The third conductor portion 51C of the third inner conductor 51 is connected to the third outer conductor 3. As a consequence, the third inner conductor 51 is electrically connected to the first outer conductor 1 and third outer conductor 3.

The fourth inner conductor 61 includes a first conductor portion 61A having an oblong form, a second conductor portion 61B extending from the first conductor portion 61A so as to be taken out to the second side face L6b of the multilayer body L6, and a third conductor portion 61C extending from the first conductor portion 61A so as to be taken out to the second side face L6b of the multilayer body L6. The first conductor portion 61A is arranged such that its longitudinal direction is parallel to the first and second side faces L6a, L6b of the multilayer body L6.

The second conductor portion 61B of the fourth inner conductor 61 is connected to the second outer conductor 2. The third conductor portion 61C of the fourth inner conductor 61 is connected to the fourth outer conductor 4. As a consequence, the fourth inner conductor 61 is electrically connected to the second outer conductor 2 and fourth outer conductor 4.

The first conductor portion 51A of the third inner conductor 51 and the first conductor portion 61A of the fourth inner conductor 61 are adjacent to each other in the opposing direction of the first side face 6a and second side face 6b in the multilayer body L6. Namely, the third inner conductor 51 and fourth inner conductor 61 have respective regions which are adjacent to each other in the opposing direction of the first side face 6a and second side face 6b in the multilayer body L6.

In the multilayer capacitor C6, the first inner conductors 31 to 33 are electrically connected to the first outer conductor 1 through the third outer conductor 3 and third inner conductor 51. The second inner conductors 41 to 43 are electrically connected to the fourth outer conductor 4 through the second outer conductor 2 and fourth inner conductor 61. As a consequence, either when the set of the first and second outer conductors 1, 2 or the set of the third and fourth outer conductors 3, 4 is connected to land patterns of a substrate or the like, the multilayer capacitor C6 can yield an equivalent series resistance greater than that of the conventional multilayer capacitor in which all the first and second inner conductors are connected to outer conductors connected to land patterns.

In particular, the multilayer capacitor C6 can set the number of outer conductors connected to no land patterns to 2, and thus can further increase the equivalent series resistance as compared with a capacitor in which the number of outer conductors connected to no land patterns is 3 or greater.

Since the equivalent series resistance is regulated by the third inner conductor 51 or fourth inner conductor 61, the multilayer capacitor C6 can increase its capacitance while raising equivalent series resistance by employing a greater number of laminated first and second inner conductors 31 to 33, 41 to 43 capable of forming a capacity component.

In the first and second inner conductors 31 to 33, 41 to 43 capable of forming the capacity component, only one species of inner conductors are connected to outer conductors connected to a land pattern of a substrate or the like no matter in which direction the multilayer capacitor C6 is mounted to the substrate or the like. Therefore, the multilayer capacitor C6 can increase its equivalent series resistance independently of the mounting direction, and thus can be mounted easily.

By connecting two outer conductors to land patterns, the multilayer capacitor C6 can yield a desirable effect (of increasing the equivalent series resistance and the like). Thus, it is sufficient for the multilayer capacitor C6 to connect two outer conductors to the substrate, whereby the circuit wiring on the mounting substrate can be simplified.

All the outer conductors (first to fourth outer conductors 1 to 4) in the multilayer capacitor C6 are formed on the first and second side faces L6a, L6b of the multilayer body L6 opposing each other. Therefore, as compared with the case where outer conductors are formed on three or more side faces (e.g., four side faces) of the multilayer body, the steps required for forming the outer conductors can be reduced. As a consequence, the multilayer capacitor C6 can be made easily.

In the multilayer capacitor, the first outer conductor 1 and third outer conductor 3 are formed on the first side face L6a of the multilayer body L6. On the other hand, the second outer conductor 2 and fourth outer conductor 4 are formed on the second side face L6b of the multilayer body L6. The first inner conductors 31 to 33 and second inner conductors 41 to 43 are alternately laminated with dielectric layers in between respectively. Consequently, in the multilayer capacitor C6, a magnetic field generated by a current flowing through the first inner conductors 31 to 33 and a magnetic field generated by a current flowing through the second inner conductors 41 to 43 cancel each other out. As a result, the multilayer capacitor C6 can reduce its equivalent series inductance. The effect of reducing the equivalent series inductance is exhibited remarkably in particular when a large number of first and second inner conductors are laminated.

Seventh Embodiment

Figure 20:
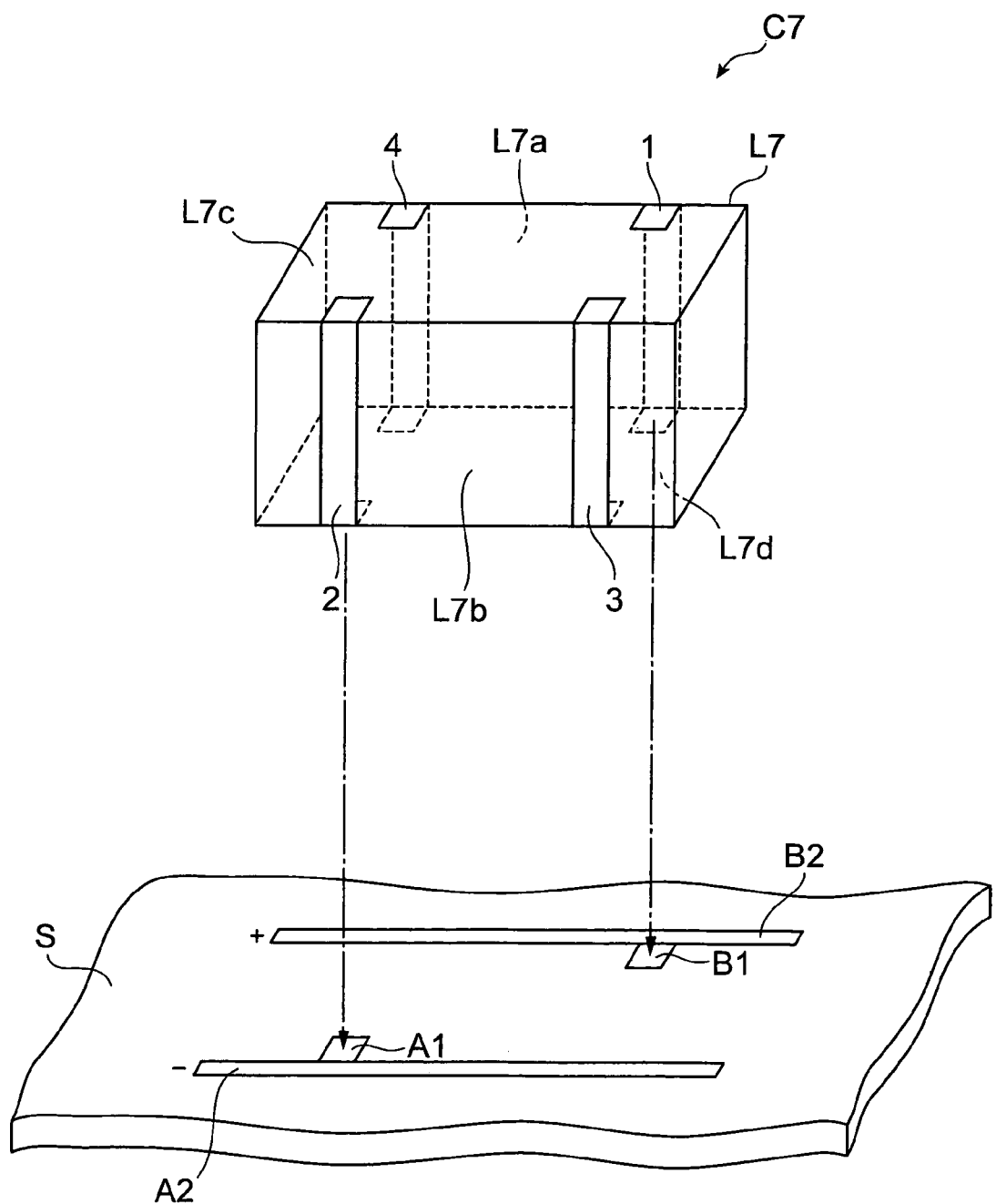
FIG. 20 is a perspective view of the multilayer capacitor in accordance with a seventh embodiment.
Figure 21:
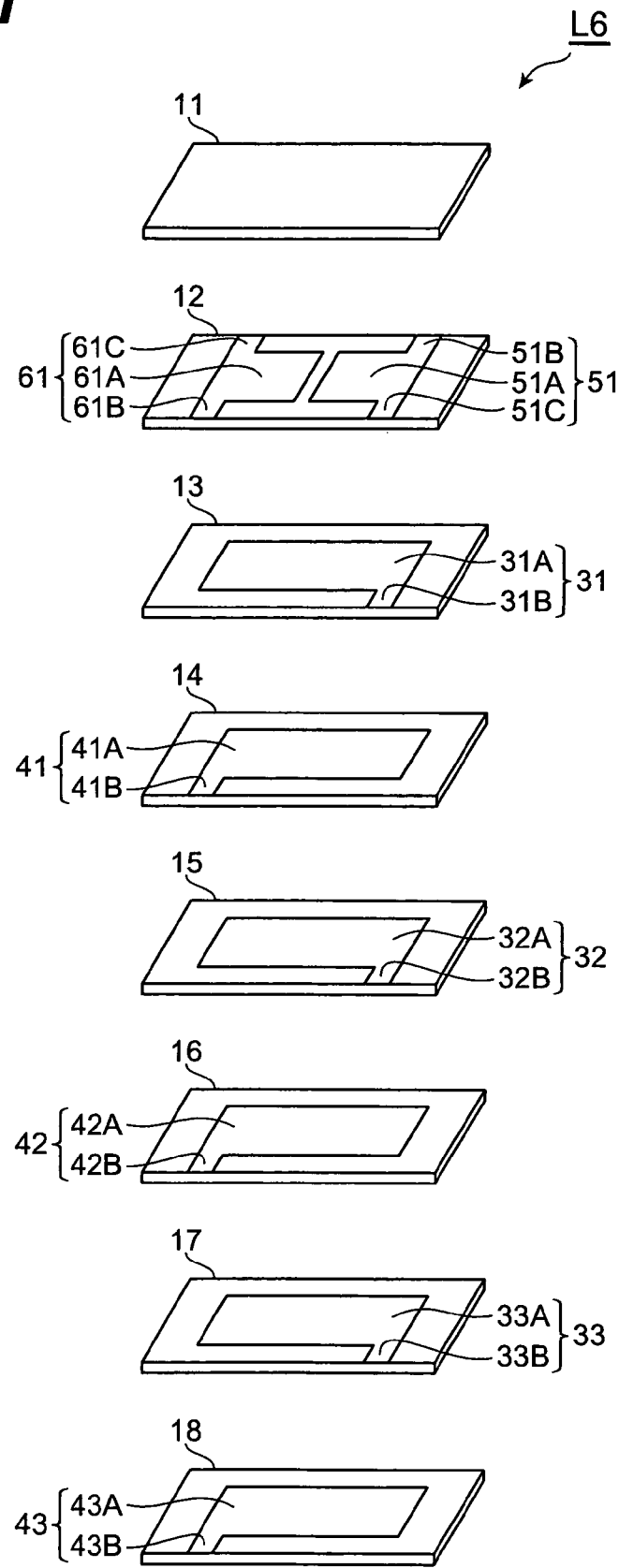
FIG. 21 is an exploded perspective view of the multilayer body included in the multilayer capacitor in accordance with the seventh embodiment.

With reference to FIGS. 20 and 21, the structure of the multilayer capacitor in accordance with a seventh embodiment will be explained. The multilayer capacitor in accordance with the seventh embodiment differs from the multilayer capacitor C5 in accordance with the fifth embodiment in terms of the arrangement of outer conductors. FIG. 20 is a perspective view of the multilayer capacitor in accordance with the seventh embodiment. FIG. 21 is an exploded perspective view of the multilayer body included in the multilayer capacitor in accordance with the seventh embodiment.

As shown in FIG. 20, the multilayer capacitor C7 in accordance with the seventh embodiment comprises a multilayer body L7 having a substantially rectangular parallelepiped form, and four outer conductors formed on side faces of the multilayer body L7. The four outer conductors are a first outer conductor 1, a second outer conductor 2, a third outer conductor 3, and a fourth outer conductor 4. The four outer conductors are formed so as to be electrically insulated from each other on the surface of the multilayer body L7.

Both of the first outer conductor 1 and fourth outer conductor 4 are positioned on a first side face L7a in side faces parallel to an inner opposing direction of the multilayer body L7 which will be explained later, i.e., the first side face L7a that is a side face extending along the longitudinal direction of side faces L7c, L7d orthogonal to the inner opposing direction of the multilayer body L7. The first outer conductor 1 and fourth outer conductor 4 are formed such that the fourth outer conductor 4 and first outer conductor 1 are arranged successively from the left side to right side of FIG. 20.

Both of the second outer conductor 2 and third outer conductor 3 are positioned on a second side face L7b in side faces parallel to the inner opposing direction of the multilayer body L7 to be explained later, i.e., the second side face L7b that is a side face extending along the longitudinal direction of side faces L7c, L7d orthogonal to the inner opposing direction of the multilayer body L7 while opposing the first side face L7a. The second outer conductor 2 and third outer conductor 3 are formed such that the second outer conductor 2 and third outer conductor 3 are arranged successively from the left side to right side of FIG. 20.

Thus, two outer conductors (the first outer conductor 1 and fourth outer conductor 4) among the four outer conductors (the first to fourth outer conductors 1 to 4) are positioned on the first side face L7a of the multilayer body L7, whereas the remaining two outer conductors (the second outer conductor 2 and third outer conductor 3) are positioned on the second side face L7b opposing the first side face L7a.

The two outer conductors (first and second outer conductors 1, 4) formed on the first side face L7a of the multilayer body L7 and the remaining two outer conductors (second and third outer conductors 2, 3) formed on the second side face L7b are located at respective positions opposing each other in a direction along which the first side face L7a and second side face L7b oppose each other. Namely, the third outer conductor 3 is located at a position opposing the first outer conductor 1 in the opposing direction of the first side face L7a and second side face L7b in the multilayer body L7. The fourth outer conductor 4 is located at a position opposing the second outer conductor 2 in the opposing direction of the first side face L7a and second side face L7b in the multilayer body L7.

As shown in FIG. 21, the multilayer body L7 is formed by laminating a plurality of (8 in this embodiment) dielectric layers 11 to 18. In the multilayer body L7, a plurality of (3 each in this embodiment) first and second inner conductors 31 to 33, 41 to 43 are included such as have respective regions opposing each other with at least one of dielectric layers 13 to 17 in between.

The first inner conductors 31 to 33 include their corresponding first main portions 31A to 33A and lead portions 31B to 33B. Each of the first main portions 31A to 33A has a substantially rectangular form. The plurality of first main portions 31A to 33A are formed at respective positions separated by a predetermined distance from a side face parallel to a direction along which the respective first inner conductors 31 to 33 and the respective second inner conductors 41 to 43 oppose each other (hereinafter simply referred to as "inner opposing direction") in the multilayer body L7.

The lead portions 31B to 33B are formed such as to be taken out to the second side face L7b of the multilayer body L7 from their corresponding first main portions 31A to 33A. The lead portion 31B is integrally formed with the first main portion 31A, and extends therefrom so as to reach the second side face L7b of the multilayer body L7. The lead portion 32B is integrally formed with the first main portion 32A, and extends therefrom so as to reach the second side face L7b of the multilayer body L7. The lead portion 33B is integrally formed with the first main portion 33A, and extends therefrom so as to reach the second side face L7b of the multilayer body L7.

The first main portions 31A, 32A, 33A of the first inner conductors 31, 32, 33 are connected to the third outer conductor 3 through the lead portions 31B, 32B, 33B, respectively. As a consequence, the plurality of first inner conductors 31 to 33 are electrically connected to each other through the third outer conductor 3.

The second inner conductors 41 to 43 include their corresponding second main portions 41A to 43A and lead portions 41B to 43B. Each of the second main portions 41A to 43A has a substantially rectangular form. The plurality of second main portions 41A to 43A are formed at respective positions separated by a predetermined distance from a side face parallel to the inner opposing direction in the multilayer body L7.

The lead portions 41B to 43B are formed such as to be taken out to the second side face L7b of the multilayer body L7 from their corresponding second main portions 41A to 43A. The lead portion 41B is integrally formed with the second main portion 41A, and extends therefrom so as to reach the second side face L7b of the multilayer body L7. The lead portion 42B is integrally formed with the second main portion 42A, and extends therefrom so as to reach the second side face L7b of the multilayer body L7. The lead portion 43B is integrally formed with the second main portion 43A, and extends therefrom so as to reach the second side face L7b of the multilayer body L7.

The second main portions 41A, 42A, 43A of the second inner conductors 41, 42, 43 are connected to the second outer conductor 2 through the lead portions 41B, 42B, 43B, respectively. As a consequence, the plurality of second inner conductors 41 to 43 are electrically connected to each other through the second outer conductor 2.

A third inner conductor 51 and a fourth inner conductor 61 are arranged at the same position in a direction along which the first inner conductor 31 and second inner conductor 41 oppose each other, i.e., in the inner opposing direction. Namely, the third inner conductor 51 and fourth inner conductor 61 are laminated so as to be positioned between the same two dielectric layers 11, 12 among the plurality of dielectric layers 11 to 18 in the multilayer body L7. The third inner conductor 51 and fourth inner conductor 61 are electrically insulated from each other.

The third inner conductor 51 includes a first conductor portion 51A having an oblong form, a second conductor portion 51B extending from the first conductor portion 51A so as to be taken out to the first side face L7a of the multilayer body L7, and a third conductor portion 51C extending from the first conductor portion 51A so as to be taken out to the second side face L7b of the multilayer body L7. The first conductor portion 51A is arranged such that opposing two sides of the oblong are parallel to the first and second side faces L7a, L7b of the multilayer body L7.

The second conductor portion 51B of the third inner conductor 51 is connected to the first outer conductor 1. The third conductor portion 51C of the third inner conductor 51 is connected to the third outer conductor 3. As a consequence, the third inner conductor 51 is electrically connected to the first outer conductor 1 and third outer conductor 3.

The fourth inner conductor 61 includes a first conductor portion 61A having an oblong form, a second conductor portion 61B extending from the first conductor portion 61A so as to be taken out to the second side face L7b of the multilayer body L7, and a third conductor portion 61C extending from the first conductor portion 61A so as to be taken out to the first side face L7a of the multilayer body L7. The first conductor portion 61A is arranged such that opposing two sides of the oblong are parallel to the first and second side faces L7a, L7b of the multilayer body L7.

The second conductor portion 61B of the fourth inner conductor 61 is connected to the second outer conductor 2. The third conductor portion 61C of the fourth inner conductor 61 is connected to the fourth outer conductor 4. As a consequence, the fourth inner conductor 61 is electrically connected to the second outer conductor 2 and fourth outer conductor 4.

The first conductor portion 51A of the third inner conductor 51 and the first conductor portion 61A of the fourth inner conductor 61 are adjacent to each other in the longitudinal direction of the first side face 7a and second side face 7b of the multilayer body L7. Namely, the third inner conductor 51 and fourth inner conductor 61 have respective regions adjacent to each other in the longitudinal direction of the first side face 7a and second side face 7b of the multilayer body L7.

In the multilayer capacitor C7, the first inner conductors 31 to 33 are electrically connected to the first outer conductor 1 through the third outer conductor 3 and third inner conductor 51. The second inner conductors 41 to 43 are electrically connected to the fourth outer conductor 4 through the second outer conductor 2 and fourth inner conductor 61. As a consequence, either when the set of the first and second outer conductors 1, 2 or the set of the third and fourth outer conductors 3, 4 is connected to land patterns of a substrate or the like, the multilayer capacitor C7 can yield an equivalent series resistance greater than that of the conventional multilayer capacitor in which all the first and second inner conductors are connected to outer conductors connected to land patterns.

In particular, the multilayer capacitor C7 can set the number of outer conductors connected to no land patterns to 2, and thus can further increase the equivalent series resistance as compared with a capacitor in which the number of outer conductors connected to no land patterns is 3 or greater.

Since the equivalent series resistance is regulated by the third inner conductor 51 or fourth inner conductor 61, the multilayer capacitor C7 can increase its capacitance while raising equivalent series resistance by employing a greater number of laminated first and second inner conductors 31 to 33, 41 to 43 capable of forming a capacity component.

In the first and second inner conductors 31 to 33, 41 to 43 capable of forming the capacity component, only one species of inner conductors are connected to outer conductors connected to a land pattern of a substrate or the like no matter in which direction the multilayer capacitor C7 is mounted to the substrate or the like. Therefore, the multilayer capacitor C7 can increase its equivalent series resistance independently of the mounting direction, and thus can be mounted easily.

By connecting two outer conductors to land patterns, the multilayer capacitor C7 can yield a desirable effect (of increasing the equivalent series resistance and the like). Thus, it is sufficient for the multilayer capacitor C7 to connect two outer conductors to the substrate, whereby the circuit wiring on the mounting substrate can be simplified.

All the outer conductors (first to fourth outer conductors 1 to 4) in the multilayer capacitor C7 are formed on the first and second side faces L7a, L7b of the multilayer body L7 opposing each other. Therefore, as compared with the case where outer conductors are formed on three or more side faces (e.g., four side faces) of the multilayer body, the steps required for forming the outer conductors can be reduced. As a consequence, the multilayer capacitor C7 can be made easily.

Though preferred embodiments of the present invention are explained in detail in the foregoing, the present invention is not limited to the above-mentioned embodiments. For example, the number of laminated dielectric layers 11 to 19 and the number of laminated first and second inner conductors 31 to 33, 41 to 43 are not limited to those stated in the above-mentioned embodiments. Therefore, for example, dielectric layers may further be laminated in the multilayer body. The multilayer body may further include first and second inner conductors.

The first inner conductors 31 to 33 are not limited to those having the forms described in the above-mentioned embodiments as long as they are electrically connected to the third outer conductor 3. The second inner conductors 41 to 43 are not limited to those having the forms described in the above-mentioned embodiments as long as they are electrically connected to the second outer conductor 2. The first inner conductors 31 to 33 and the second inner conductors 41 to 43 may oppose each other with at least one dielectric layer in between. It will be sufficient if there is at least one pair of the first inner conductors 31 to 33 and second inner conductors 41 to 43 opposing each other with a dielectric layer in between.

The number and position in the laminating direction of the third inner conductor 51 are not limited to those stated in the above-mentioned embodiments. The number and position in the laminating direction of the fourth inner conductor 61 are not limited to those stated in the above-mentioned embodiments.

The third inner conductor 51 is not limited to those having the forms described in the above-mentioned embodiments as long as it is electrically connected to the first outer conductor 1 and third outer conductor 3. The fourth inner conductor 61 is not limited to those having the forms described in the above-mentioned embodiments as long as it is electrically connected to the second outer conductor 2 and fourth outer conductor 4. It is not necessary for the third inner conductor 51 and fourth inner conductor 61 to have respective regions opposing each other in the laminating direction of the multilayer body.

The positions of outer conductors are not limited to those described in the above-mentioned embodiments as long as they are formed two by two on the first and second side faces while the two outer conductors formed on the first side face and the remaining two outer conductors formed on the second side face are located at respective positions opposing each other in the opposing direction of the first and second side faces. Alternatively, it will be sufficient if the first and second outer conductors are respectively positioned on two side faces of the multilayer body opposing each other, while the third and fourth outer conductors are respectively positioned on two side faces of the multilayer body opposing each other. In this case, the first to fourth outer conductors may be positioned on respective side faces completely different from each other.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising a multilayer body in which a plurality of dielectric layers are laminated, and first to fourth outer conductors formed on the multilayer body;
   wherein the multilayer body includes first to fourth inner conductors;
   wherein the first and second inner conductors have respective regions opposing each other with at least one dielectric layer in between;
   wherein two outer conductors in the first to fourth outer conductors are formed on a first side face of the multilayer body parallel to a direction along which the first and second inner conductors oppose each other, whereas the remaining two outer conductors are formed on a second side face opposing the first side face;
   wherein the two outer conductors formed on the first side face and the remaining two outer conductors formed on the second side face are located at respective positions opposing each other in a direction along which the first and second side faces oppose each other;
   wherein the first inner conductor is connected to the third outer conductor;
   wherein the second inner conductor is connected to the second outer conductor;
   wherein the third inner conductor is connected to the first and third outer conductors; and
   wherein the fourth inner conductor is connected to the second and fourth outer conductors.

2. A multilayer capacitor according to claim 1, wherein the third and fourth inner conductors have respective regions opposing each other with at least one dielectric layer in between;
   wherein the first and fourth outer conductors are formed on the first side face;
   wherein the second and third outer conductors are formed on the second side face; and
   wherein the second, first, fourth, and third outer conductors are located at respective positions opposing the first, second, third, and fourth outer conductors in the opposing direction of the first and second side faces in the multilayer body.

3. A multilayer capacitor according to claim 1, wherein the third and fourth inner conductors have respective regions opposing each other with at least one dielectric layer in between;
   wherein the first and third outer conductors are formed on the first side face;
   wherein the second and fourth outer conductors are formed on the second side face; and
   wherein the second, first, fourth, and third outer conductors are located at respective positions opposing the first, second, third, and fourth outer conductors in the opposing direction of the first and second side faces in the multilayer body.

4. A multilayer capacitor according to claim 1, wherein the third and fourth inner conductors are arranged at the same position in the opposing direction of the first and second inner conductors while having respective regions adjacent to each other in the opposing direction of the first and second side faces;
   wherein the first and third outer conductors are formed on the first side face;
   wherein the second and fourth outer conductors are formed on the second side face; and
   wherein the second, first, fourth, and third outer conductors are located at respective positions opposing the first, second, third, and fourth outer conductors in the opposing direction of the first and second side faces in the multilayer body.

5. A multilayer capacitor according to claim 1, wherein the third and fourth inner conductors are arranged at respective positions different from each other in the opposing direction of the first and second inner conductors;
   wherein the first and third outer conductors are formed on the first side face;
   wherein the second and fourth outer conductors are formed on the second side face; and
   wherein the fourth, third, second, and first outer conductors are located at respective positions opposing the first, second, third, and fourth outer conductors in the opposing direction of the first and second side faces in the multilayer body.

6. A multilayer capacitor according to claim 1, wherein the third and fourth inner conductors are arranged at the same position in the opposing direction of the first and second inner conductors;
   wherein the first and third outer conductors are formed on the first side face;
   wherein the second and fourth outer conductors are formed on the second side face; and
   wherein the fourth, third, second, and first outer conductors are located at respective positions opposing the first, second, third, and fourth outer conductors in the opposing direction of the first and second side faces in the multilayer body.

7. A multilayer capacitor comprising a multilayer body in which a plurality of dielectric layers are laminated, and first to fourth outer conductors formed on the multilayer body;
   wherein the multilayer body includes first to fourth inner conductors;
   wherein the first and second inner conductors have respective regions opposing each other with at least one dielectric layer in between;
   wherein the first outer conductor is formed on a side face of the multilayer body parallel to a direction along which the first and second inner conductors oppose each other;
   wherein the second outer conductor is formed on a side face of the multilayer body opposing the side face formed with the first outer conductor, at a position opposing the first outer conductor in a direction along which the side face formed with the second outer conductor and the side face formed with the first outer conductor oppose each other;
   wherein the third outer conductor is formed on a side face of the multilayer body parallel to the opposing direction of the first and second inner conductors;
   wherein the fourth outer conductor is formed on a side face of the multilayer body opposing the side face formed with the third outer conductor, at a position opposing the third outer conductor in a direction along which the side face formed with the fourth outer conductor and the side face formed with the third outer conductor oppose each other;
   wherein the first inner conductor is connected to the third outer conductor;
   wherein the second inner conductor is connected to the second outer conductor;
   wherein the third inner conductor is connected to the first and third outer conductors; and
   wherein the fourth inner conductor is connected to the second and fourth outer conductors.

8. A multilayer capacitor according to claim 7, wherein the third and fourth inner conductors have respective regions opposing each other with at least one dielectric layer in between;
   wherein the side face formed with the first outer conductor and the side face formed with the fourth side face are the same; and
   wherein the side face formed with the second outer conductor and the side face formed with the third outer conductor are the same.

9. A multilayer capacitor according to claim 7, wherein the third and fourth inner conductors have respective regions opposing each other with at least one dielectric layer in between;
   wherein the side face formed with the first outer conductor and the side face formed with the third outer conductor are the same; and
   wherein the side face formed with the second outer conductor and the side face formed with the fourth outer conductor are the same.

10. A multilayer capacitor according to claim 7, wherein the side face formed with the first outer conductor and the side face formed with the third outer conductor are the same;
    wherein the side face formed with the second outer conductor and the side face formed with the fourth outer conductor are the same; and
    wherein the third and fourth inner conductors are arranged at the same position in the opposing direction of the first and second inner conductors, while having respective regions adjacent to each other in the opposing direction of the side face formed with the first and third outer conductors and the side face formed with the second and fourth outer conductors.

* * * * *